United States Patent
Fukuzawa et al.

(10) Patent No.: US 8,359,035 B2
(45) Date of Patent: Jan. 22, 2013

(54) BASE STATION APPARATUS, MOBILE STATION AND WIRELESS COMMUNICATION CONTROLLING METHOD

(75) Inventors: Yohji Fukuzawa, Fukuoka (JP); Akihiro Sato, Fukuoka (JP); Tomonari Kagimoto, Fukuoka (JP); Hiroshi Ohiwane, Kawasaki (JP); Satoshi Ushiroda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 433 days.

(21) Appl. No.: 12/431,933

(22) Filed: Apr. 29, 2009

(65) Prior Publication Data

US 2009/0318155 A1 Dec. 24, 2009

(30) Foreign Application Priority Data

Jun. 19, 2008 (JP) ................. 2008-160931

(51) Int. Cl.
H04W 36/00 (2009.01)
H04W 40/00 (2009.01)
H04W 72/00 (2009.01)
H04W 4/00 (2009.01)
H04H 20/71 (2008.01)
H04L 12/28 (2006.01)

(52) U.S. Cl. ........ 455/437; 455/436; 455/438; 455/445; 455/453; 370/312; 370/331; 370/332; 370/395.31

(58) Field of Classification Search .......... 455/436–440; 370/312, 331, 332, 338
See application file for complete search history.

(56) References Cited

U.S. PATENT DOCUMENTS 7,313,628 B2 * 12/2007 Chaskar et al. ............... 709/238
7,512,110 B2    3/2009 Sayeedi et al.
2005/0048974 A1  3/2005 Kim et al.
2005/0197124 A1  9/2005 Kang et al.
2007/0253372 A1 11/2007 Nakayasu
2008/0159231 A1* 7/2008 Kim et al. ..................... 370/331
2008/0212536 A1* 9/2008 Lakshmi Narayanan et al. .............................. 370/331
2009/0106175 A1* 4/2009 Bonjour et al. ................. 706/12

FOREIGN PATENT DOCUMENTS

EP 1 469 697 10/2004
(Continued)

OTHER PUBLICATIONS

Handover signaling in E-UTRAN 3GPP TSG-RAN WG2#59, Agenda item 4.5.2 by Qualcomm Europe Aug. 20-24, 2007.*

(Continued)

*Primary Examiner* — Dwayne Bost
*Assistant Examiner* — Nalini Mummalaneni
(74) *Attorney, Agent, or Firm* — Myers Wolin, LLC

(57) ABSTRACT

A wireless base station includes a candidate-cell obtaining unit that obtains a plurality of wireless communication route candidates usable for wireless communication of a mobile station with wireless base stations; a candidate-cell extracting unit that determines whether a wireless communication route candidate via which wireless communication can be performed is included in a plurality of wireless communication route candidates managed by the wireless base station itself from among the obtained wireless communication route candidates; a self-station determining unit; and a handover preparing unit that, when wireless communication can be performed via at least any of the wireless communication route candidates managed by the wireless base station itself according to the result of determination, notifies a wireless base station with which the mobile station is in wireless communication that wireless communication can be performed with the mobile station.

7 Claims, 13 Drawing Sheets

FOREIGN PATENT DOCUMENTS

| | | |
|---|---|---|
| EP | 1 986 454 | 10/2008 |
| EP | 1986454 A1 * | 10/2008 |
| JP | 2007-520936 | 7/2007 |
| JP | 2007-527176 | 9/2007 |
| JP | 2007-295318 | 11/2007 |
| WO | 2008/023613 | 2/2008 |

OTHER PUBLICATIONS

A Hierarchical and Distributed Handover Management Approach for Heterogeneous Networking Environments Authors: Lucian Suciu, Karine Guillouard Third International Conference on Networking and Services, 2007. ICNS. Publication Year: 2007.*

LTE neighborhood list and measurement organization 3GPP TSG-RAN WG2#56, Agenda item 11.6 by Siemens Published Nov. 10, 2006.*

ETSI TS 136 300 V8.3.0; Technical Specification; "Universal Mobile Telecommunications System (UMTS); Evolved Universal Terrestrial Radio Access (E-UTRA) and Evolved Universal Terrestrial Radio Access (E-UTRAN); Overall description"; Stage 2 (3GPP TS 36.300 version 8.3.0 Release 8); Dated Jan. 2008; [Ref.: EESR dated Feb. 2, 2010].

QUALCOMM Europe; "Handover signalling in E-UTRAN"; Document for: Discussion and decision; Agenda Item: 4.5.2.; 3GPP TSG-RAN WG 2 meeting #59; R2-073495; Athens, Greece, Aug. 20-24, 2007; [Ref.: EESR dated Feb. 2, 2010].

Extended European Search Report and Communication which includes Abstract and Title for corresponding European Patent Application No. 09153817.3, dated Feb. 2, 2010.

Notice of Rejection Office Action issued for corresponding Japanese Patent Application No. JP2008-160931 dated Mar. 14, 2012 with English translation.

* cited by examiner

| PRIORITY | CELL CANDIDATE | NAME OF WIRELESS BASE STATION | HANDOVER PREPARATION RESULT |
|---|---|---|---|
| 1 | C | WIRELESS BASE STATION Y | — |
| 2 | D | WIRELESS BASE STATION Y | — |
| 3 | E | WIRELESS BASE STATION Z | — |
| 4 | F | WIRELESS BASE STATION Z | — |

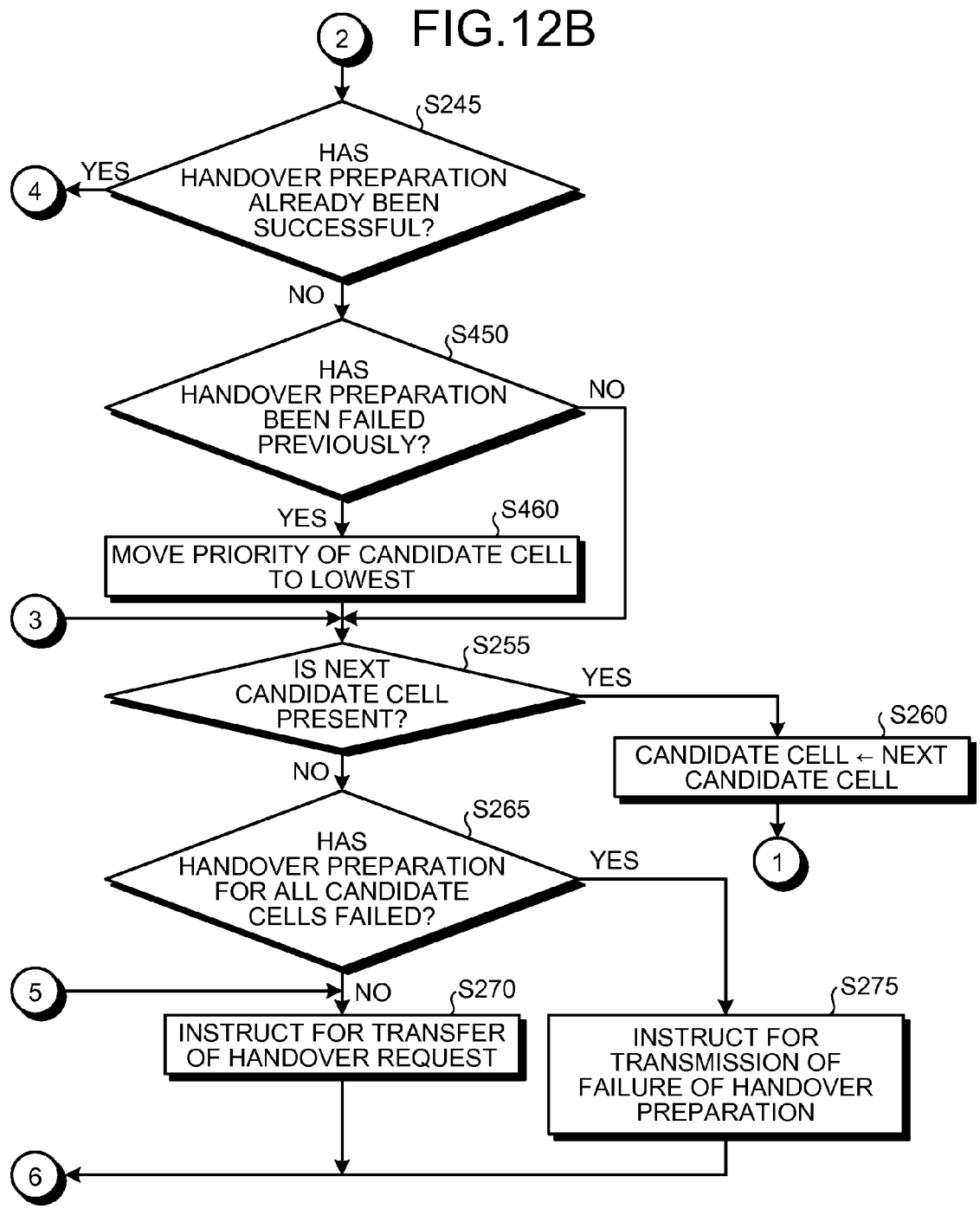

BASE STATION APPARATUS, MOBILE STATION AND WIRELESS COMMUNICATION CONTROLLING METHOD

CROSS-REFERENCE TO RELATED APPLICATION(S)

This application is based upon and claims the benefit of priority of the prior Japanese Patent Application No. 2008-160931, filed on Jun. 19, 2008, the entire contents of which are incorporated herein by reference.

FIELD

The present invention relates to a base station apparatus, mobile station, wireless communication controlling method, and wireless communication control program for achieving handover across wireless base stations.

BACKGROUND

Conventionally, to facilitate a stepwise transition from third-generation (3G) mobile communications to fourth-generation (4G) mobile communications, Long Term Evolution (LTE: supper 3G) has been developed as a high-speed mobile communications standard. While this LTE is positioned as an extension of International Mobile Telecommunications-2000 (IMT-2000), for the purpose of a smooth transition to 4G, wireless interfaces and Radio Access Controller (RAC) architectures are under drastic review from 3G systems. As a result, with compression of delay time and improvement in communication rate, LTE achieves a data communication rate of downlink 300 megabits per second at maximum and uplink 50 megabits per second at maximum.

Here, an example of the configuration of a mobile communication system using LET is explained with reference to FIG. 1. As depicted in FIG. 1, in the mobile communication system using this LTE, a plurality of wireless base stations are directly connected to a gateway apparatus (Evolved Packet Core: EPC) connected to a core network, and a Radio Network Controller (RNC) that controls these wireless base stations in a centralized manner in a conventional 3G system is omitted. Each wireless base station manages a plurality of communication areas (hereinafter, referred to as "cells") to control wireless communication via any of the managed cells. In the mobile communication system using LTE, when a mobile station moves across cells (such movement is hereinafter referred to as "handover"), a connection with the move-origin cell is once cut off, and then a connection with the move-destination cell is established. The same goes for the case in which a mobile station moves across wireless base stations. For example, as depicted in FIG. 1, when a mobile station in wireless communication via a cell B managed by a wireless base station X moves to a cell C managed by a wireless base station Y, a connection with the cell B is cut off, and then a connection with the cell C is established.

When such a mobile station moves across wireless base stations, a connection between a cell managed by a wireless base station of move destination and the mobile station may fail. At this time, a wireless base station of move origin makes a reconnection under the initiative of a network system in cooperation with the wireless base station of move destination.

Also, a mobile communication system has been known in which, when a connection between the cell managed by the wireless base station of move destination and the mobile station fails, a base station performing handover control recognizes in advance the occurrence of a ping-pong phenomenon of repeating a reconnection until a connection between the cell managed by the wireless base station of move destination and the mobile station becomes successful, thereby preventing such a ping-pong phenomenon.

Here, an example is explained by using FIG. 2. in which a wireless base station performs handover control when the mobile station moves across wireless base stations in the mobile communication system using LTE. As depicted in FIG. 2, a handover request message including a plurality of handover-enable candidate cells at possible move destinations of the mobile station is transmitted to a wireless base station X currently in communication. Then, the wireless base station X selects one by one from the candidate cells included in the received message to cause a wireless base station Y managing the selected candidate cell to prepare handover allowing wireless communication via the candidate cell, and then receives the result indicative of either success or failure of the handover preparation. Specifically, the mobile station transmits to the wireless base station a message for requesting handover with a list containing a plurality of handover-enabled candidate cells (C, D, E, F) and, upon reception of this message, the wireless base station X selects a highest-priority candidate cell C and transmits to the wireless base station Y managing the selected candidate cell C a handover request for the candidate cell C. When a handover preparation for the candidate cell C fails, the wireless base station Y notifies the wireless base station X that the handover preparation for the candidate cell C fails. Upon reception of this failure notification for the handover request for the candidate cell C, the wireless base station X selects a next candidate cell D from among the candidate cells, and then transmits to the wireless base station Y managing the selected candidate cell D a handover request for the candidate cell D. When the wireless base station Y fails a handover preparation for the candidate cell D, the wireless base station X receives a notification indicative of a failure of the handover request for the candidate cell D, further selects a next candidate cell E, and transmits to a wireless base station Z managing the selected candidate cell E a handover request for the candidate cell E. When a handover preparation for the candidate cell E is successful, the wireless base station Z notifies the wireless base station X that the handover preparation for the candidate cell E is successful. The wireless base station X then notifies the mobile station making the handover request that the handover preparation for the candidate cell E managed by the wireless base station Z has been completed. The mobile station then performs wireless communication via the cell E managed by the wireless base station Z.

The conventional technology explained above is disclosed in, for example, Japanese Laid-open Patent Publication No. 2007-295318 and Japanese National Phase PCT Laid-open Publication No. 2007-527176.

However, in handover control of wireless base stations when the mobile station moves across the wireless base station in the mobile communication system using LTE, when a wireless base station fails a handover preparation, the number of messages exchanged among the wireless base stations is disadvantageously increased to put a load on the network. That is, the wireless base station receiving from the mobile station moving across the wireless base stations a handover request message including a plurality of handover-enabled candidate cells transmits a handover request to one of the received candidate cells, and then receives the result for every transmission. Therefore, the wireless base station communicates two messages, that is, transmission and reception, for each candidate cell until a success notification comes from a candidate cell. Therefore, the number of messages is increased when the number of failure notifications from the candidate cells is large, thereby putting a load on the network.

In particular, when many mobile stations simultaneously perform handover, for example, the number of messages exchanged among the wireless base stations is more significantly increased. That is, in the mobile communication system using LTE, as explained above, since the wireless base station controls wireless communication via a cell, the number of occasions of movement across wireless base stations is surely larger than the number of occasions of movement across RNCs in the current 3G system, thereby increasing the number of messages among the wireless base stations.

SUMMARY

According to an aspect of an embodiment, a base station apparatus includes an obtaining unit that obtains a plurality of wireless communication route candidates usable for wireless communication of a mobile station with the base station apparatus; a determining unit that determines whether a wireless communication route candidate allowing wireless communication is included in a plurality of wireless communication route candidates managed by the base station apparatus from among the wireless communication route candidates obtained by the obtaining unit; and a notifying unit that, when wireless communication can be performed via at least any of the wireless communication route candidates managed by the base station apparatus according to the result of determination by the determining unit, notifies a base station apparatus with which the mobile station is in wireless communication that wireless communication can be performed with the mobile station.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING(S)

FIGS. 12A and 12B are flowcharts of the process of a handover controlling unit according to the third embodiment.

DESCRIPTION OF EMBODIMENT(S)

Embodiments of a wireless base station in a mobile communication system using LTE according to the present invention are explained in detail below based on the drawings. Note that these embodiments are not meant to restrict the present invention.

When a mobile station moves among cells across wireless base stations, a wireless base station according to a first embodiment obtains from a wireless base station receiving a handover request from the mobile station (hereinafter, such a wireless base station is referred to as "SeNB") a cell candidate list containing a plurality of cell candidates with which handover of the mobile station can be performed, sequentially performs a handover preparation for a plurality of cell candidates (for example, three cell candidates) managed by the mobile station itself from among the cell candidates contained in the obtained cell candidate list and, when a handover preparation is successful for any of the cell candidates, transmits a success notification to SeNB. At this time, even when a handover preparation fails for each of the cell candidates, it is not required to report a failure to SeNB every time. That is, when a handover preparation is successful or when a handover preparation fails for the cell candidates managed by the wireless base station itself (two or all three cell candidates), only one report message is enough to be transmitted to SeNB. Here, when a cell candidate managed by another base station apparatus is present, instruction for handover preparation may be transferred not to SeNB but to this other base station apparatus for the remaining cell candidates. Here, the mobile station is a portable mobile wireless communication machine, such as a cellular phone, a Personal Handyphone System (PHS) phone, or a Personal Digital Assistant (PDA). Also, it is assumed in the present embodiment that "handover preparation" means that wireless communication via a cell is enabled, and "perform handover" means that wireless communication with a cell of move origin of the mobile station after handover preparation is cut off.

Figure 1:
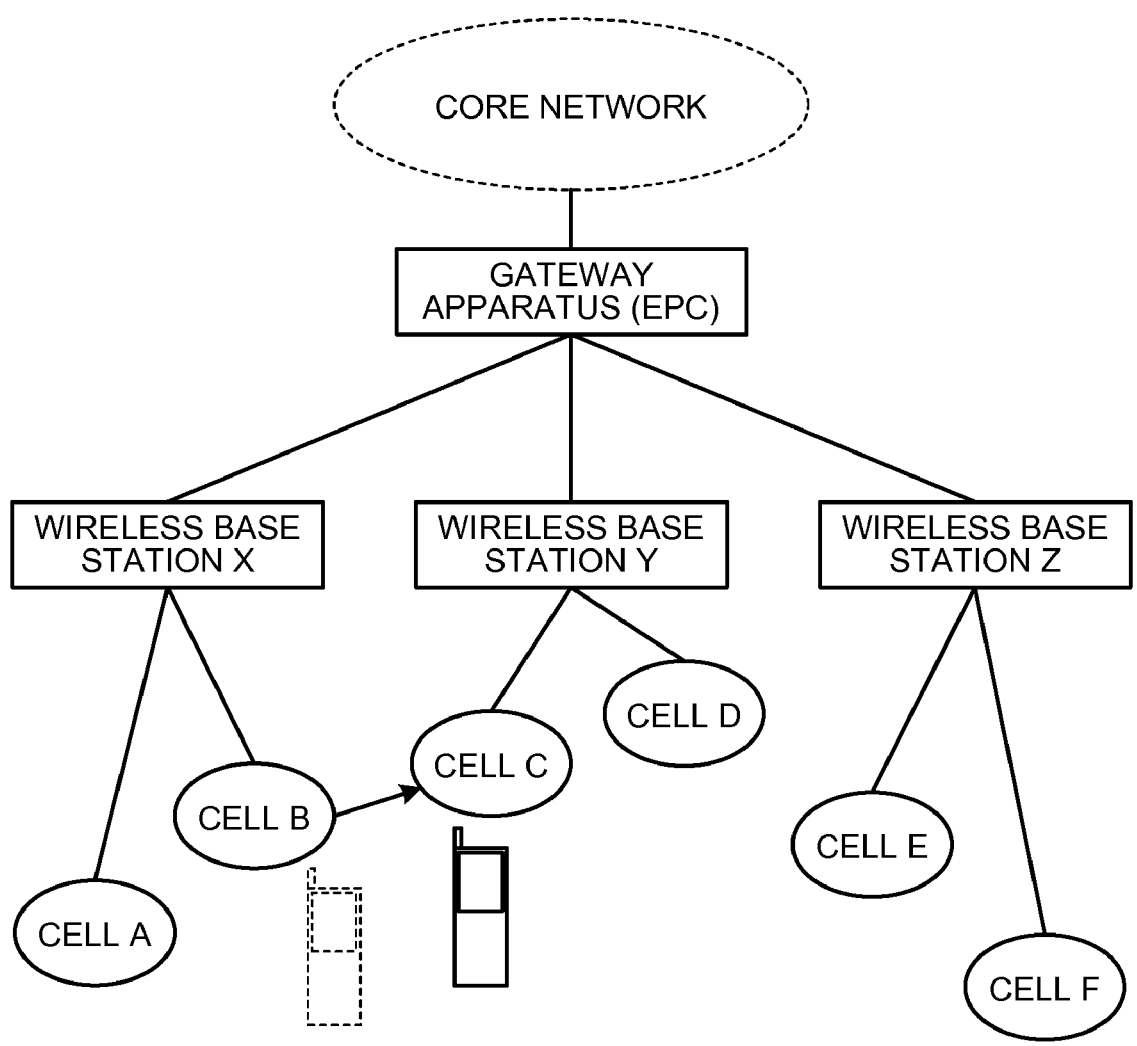
FIG. 1 is a drawing of the configuration of a mobile wireless communication system.
Figure 2:
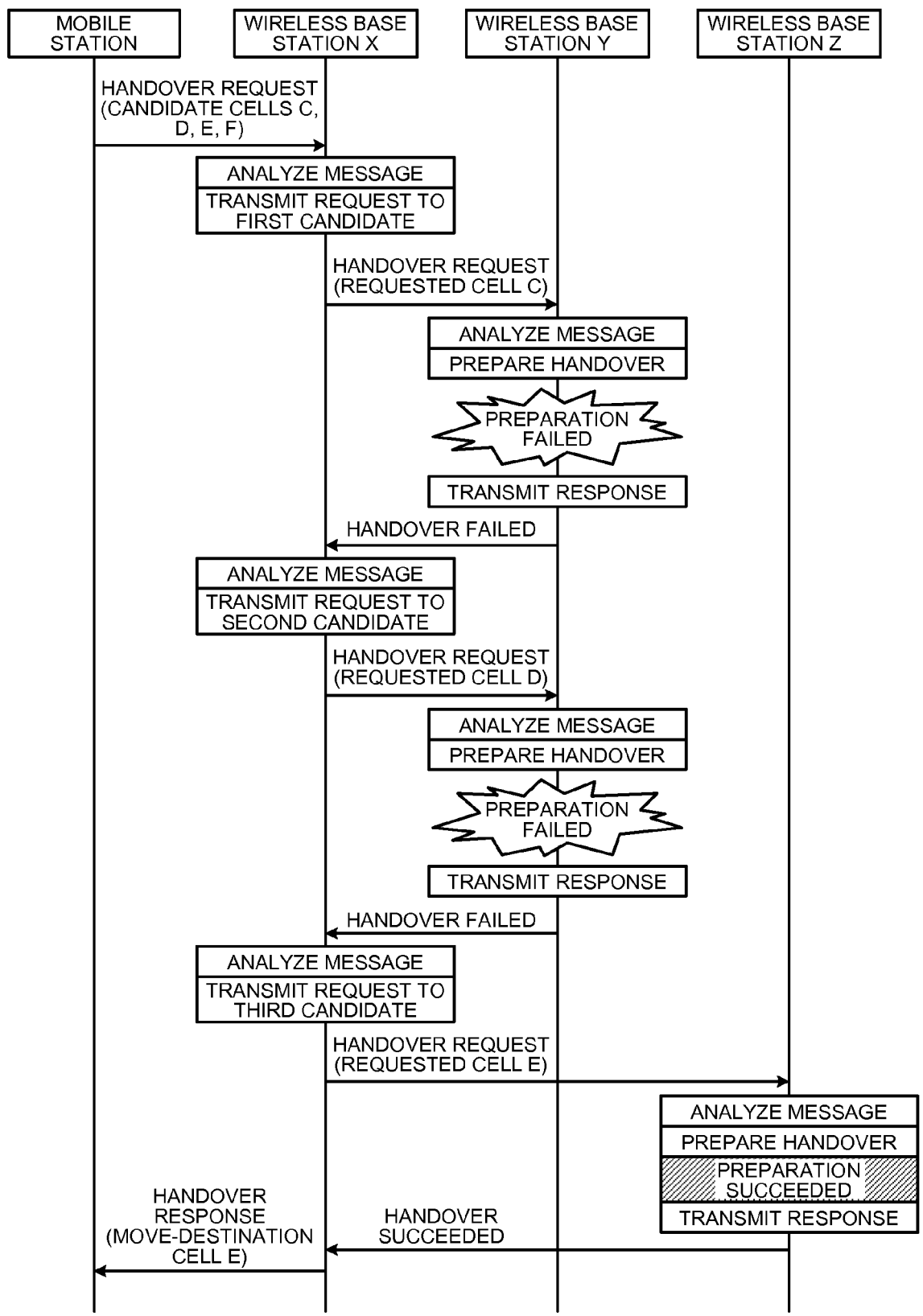
FIG. 2 is a sequence diagram of conventional handover control across wireless base stations.
Figure 3:
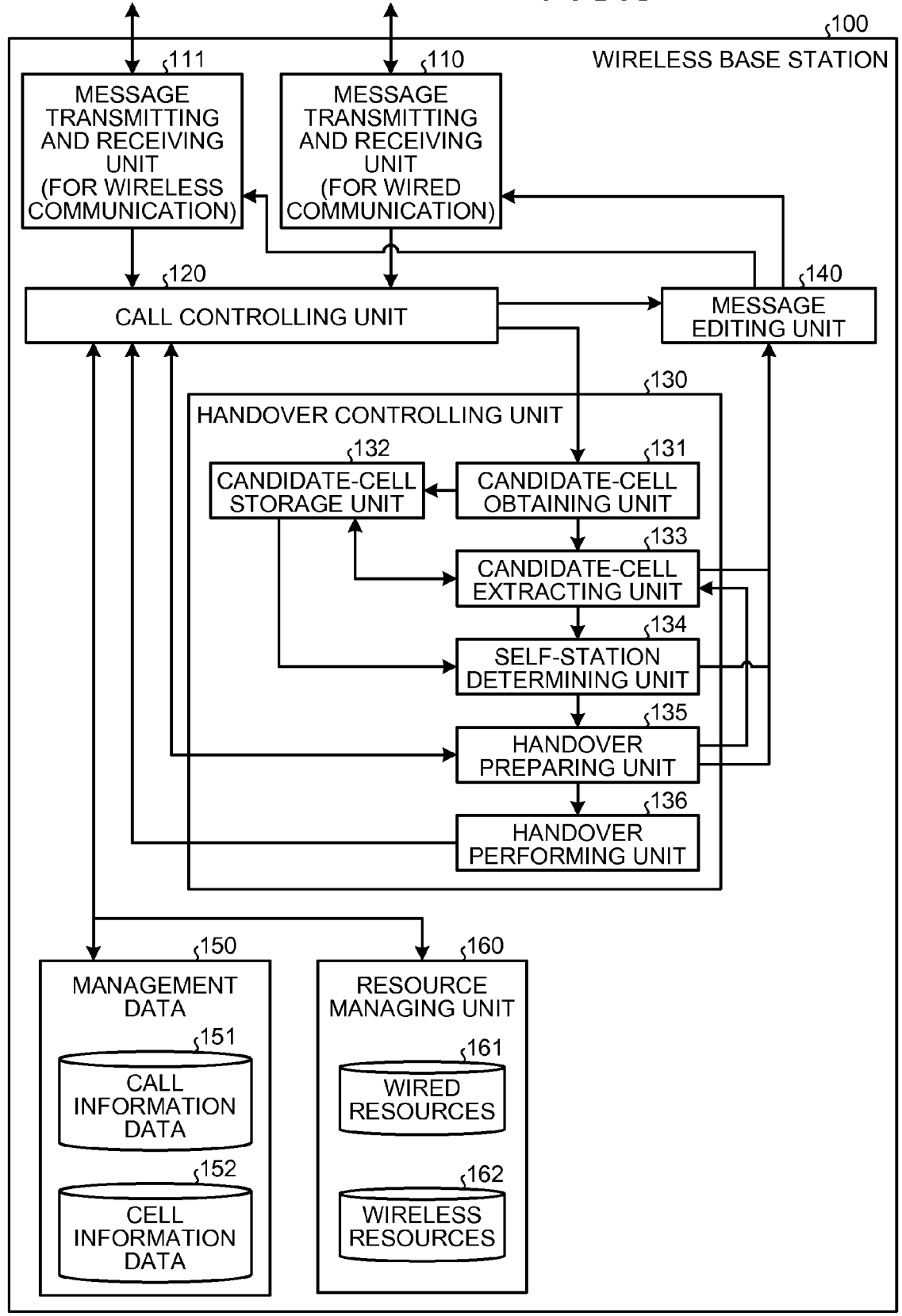
FIG. 3 is a functional block diagram of the configuration of a wireless base station according to a first embodiment.

FIG. 3 is a functional block diagram of the configuration of the wireless base station according to the first embodiment. As depicted in FIG. 3, a wireless base station 100 includes a message transmitting and receiving unit (for wired communication) 110, a message transmitting and receiving unit (for wireless communication) 111, a call controlling unit 120, a handover controlling unit 130, a message editing unit 140, management data 150, and a resource managing unit 160.

The message transmitting and receiving unit (for wired communication) 110 transmits and receives messages to and from another wireless base station. Specifically, the message transmitting and receiving unit 110, when its wireless base station is not SeNB, receives from another wireless base station a handover request message including a cell candidate list for output to the call controlling unit 120. Also, the message transmitting and receiving unit 110, when its wireless base station is SeNB, receives from another wireless base station a handover response message notifying that a handover preparation is successful or fails for output to the call controlling unit 120. Furthermore, the message transmitting and receiving unit 110 obtains various messages from the message editing unit 140 and, in response to the messages, makes a transmission to another wireless base station.

The message transmitting and receiving unit (for wireless communication) 111 transmits and receives messages with the mobile station making a handover request. Specifically, the message transmitting and receiving unit 111, when its wireless base station is SeNB, receives a handover request message including a cell candidate list containing a plurality of handover-enabled cell candidate from the mobile station making a handover request for output to the call controlling unit 120. Also, the message transmitting and receiving unit 111 obtains from the message editing unit 140 a handover response message notifying that a handover preparation is successful for transmission to the mobile station making the handover request. The handover response message to the mobile station is assumed to include information about a cell for which handover is performed and the wireless base station managing the cell.

The call controlling unit 120 performs call control in units of mobile stations according to the message output from the message transmitting and receiving unit 110. Specifically, the call controlling unit 120 outputs a handover request message output from the message transmitting and receiving unit 110 to the handover controlling unit 130. Also, when receiving from the message transmitting and receiving unit 110 a handover response message notifying that a handover preparation is successful, the call controlling unit 120 requests the resource managing unit 160 to deallocate a resource to the cell of move origin, and then outputs a handover response message to the message editing unit 140. Furthermore, the call controlling unit 120 outputs to the message editing unit 140 a response message output from the message transmitting and receiving unit 110 notifying that a handover preparation fails. Still further, when obtaining from the handover controlling unit 130 a handover preparation request to a cell candidate, the call controlling unit 120 requests the resource managing unit 160 to allocate a resource. Then, when a resource is allocated by the resource managing unit 160 to the cell candidate, the call controlling unit 120 notifies the handover controlling unit 130 that a handover preparation is successful. On the other hand, when a resource is not allocated by the resource managing unit 160 to the cell candidate, the call controlling unit 120 notifies the handover controlling unit 130 that a handover preparation fails. When obtaining a handover performing request from the handover controlling unit 130, to cut off wireless communication with a cell of move origin, the call controlling unit 120 requests the resource managing unit 160 to deallocate the resource to the cell of move origin to perform handover.

The handover controlling unit 130 includes a candidate-cell obtaining unit 131, a candidate-cell storage unit 132, a candidate-cell extracting unit 133, a self-station determining unit 134, a handover preparing unit 135, and a handover performing unit 136.

The candidate-cell obtaining unit 131 obtains from the call controlling unit 120 a handover request message including a cell candidate list for storage in the candidate-cell storage unit 132. The candidate-cell obtaining unit 131 then outputs a handover request message to the candidate-cell extracting unit 133.

Figures 4, 5:
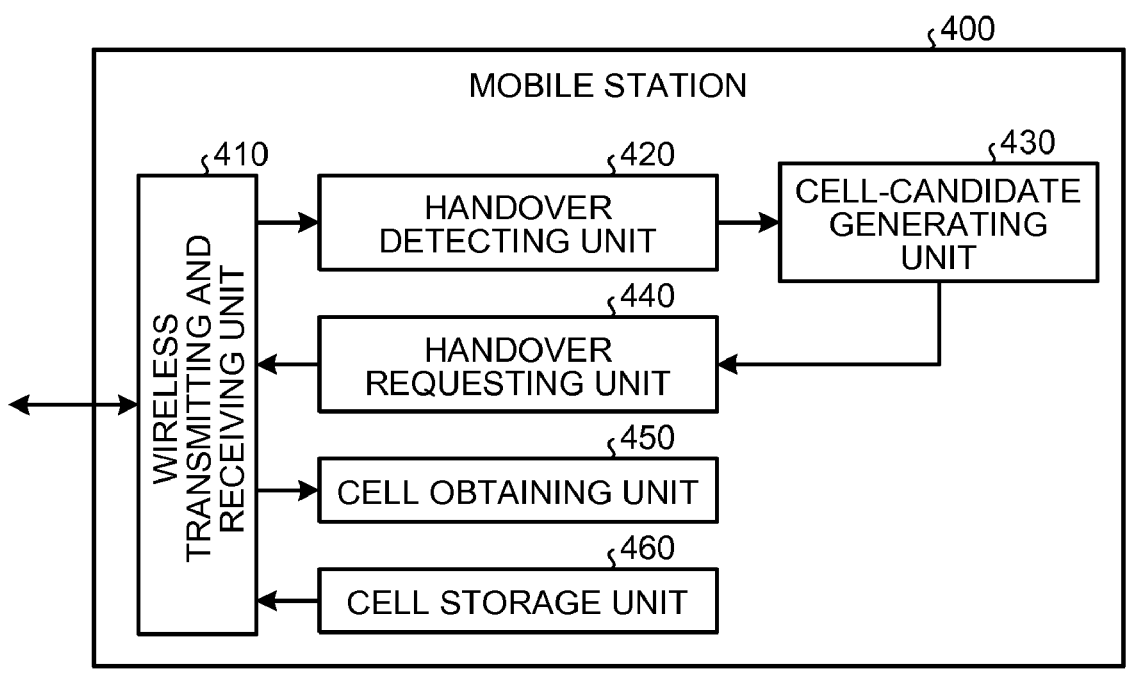
FIG. 4 is a drawing of an example of data structure of a candidate-cell storage unit.
FIG. 5 is a functional block diagram of the configuration of a mobile station according to the first embodiment.

The candidate-cell storage unit 132 retains the cell candidate list and the results of handover preparation for the cell candidates. Here, the retained data structure is explained with reference to FIG. 4. As depicted in FIG. 4, the candidate-cell storage unit 132 retains a priority, a cell candidate, the name of a wireless base station managing the cell candidate, a handover preparation result. The priority is a position in priority for performing handover for the cell candidate. For example, a larger number indicates a lower position in priority. The cell candidate is a cell desired by the mobile station for handover. The name of the wireless base station is the name of a wireless base station managing the cell candidate. The handover preparation result is the result of performing handover preparation for the cell candidate, and "success" or "failure" is retained.

When obtaining a handover request message from the candidate-cell obtaining unit 131, the candidate-cell extracting unit 133 extracts a cell candidate positioned at the first in priority and the name of a wireless base station managing the cell candidate from the candidate-cell storage unit 132 so as to specify the cell candidate for handover preparation. Also, when obtaining from the handover preparing unit 135 a handover failure notification including the priority of the cell candidate performing a handover preparation, the candidate-cell extracting unit 133 extracts a cell candidate positioned at the next highest in priority and the name of a wireless base station managing the cell candidate so as to specify the cell candidate for handover preparation. At this time, if no cell candidate corresponding to the next highest position in priority is present, the candidate-cell extracting unit 133 instructs the message editing unit 140 to transmit a handover failure message to SeNB. When a cell candidate corresponding to the next highest position in priority is present, the candidate-cell extracting unit 133 outputs the extracted priority, cell candidate, and name of the wireless base station to the self-station determining unit 134.

When obtaining the priority, the cell candidate, and the name of the wireless base station from the candidate-cell extracting unit 133, the self-station determining unit 134 determines, for a handover preparation for a cell candidate of the wireless base station itself, whether a wireless base station corresponding to the obtained name of the wireless base station is the wireless base station itself. Here, in place of using the name of the wireless base station obtained from the candidate-cell extracting unit 133, the self-station determining unit 134 may extract from cell information data of the management data 150 cells managed by the wireless base station itself to determine whether the cells include a cell candidate. If the obtained name of the wireless base station is the name of the wireless base station itself, the self-station determining unit 134 outputs to the handover preparing unit 135 the priority, the cell candidate, and the name of the wireless base station. On the other hand, if the obtained name of the wireless base station is not the name of the wireless base station itself, the self-station determining unit 134 extracts from the candidate-cell storage unit 132 a plurality of cell candidates following the position in priority corresponding to the obtained cell candidate to instruct the message editing unit 140 to transmit a handover request message including the extracted cell candidates to the wireless base station corresponding to the obtained name of the wireless base station.

When obtaining the priority, the cell candidate, and the name of the wireless base station from the self-station determining unit 134, the handover preparing unit 135 instructs the call controlling unit 120 to make a handover preparation request to the cell candidate. Then, when obtaining from the call controlling unit 120 a handover preparation success notification, if the wireless base station managing the cell candidate is SeNB, the handover preparing unit 135 outputs a handover performing request to the handover performing unit 136 so as to switch wireless communication from the cell of move origin to the cell of move destination. If the wireless base station managing the cell candidate is not SeNB, the handover preparing unit 135 instructs the message editing unit 140 to transmit a handover response message to SeNB to notify SeNB that a handover preparation is successful. When obtaining a handover preparation failure notification from the call controlling unit 120, the handover preparing unit 135 outputs to the candidate-cell extracting unit 133 a handover failure notification including the priority of the cell candidate performing the handover preparation.

The handover performing unit 136 obtains a handover performing request from the handover preparing unit 135, and outputs the handover performing request to the call controlling unit 120.

When obtaining a handover response message from the call controlling unit 120, the message editing unit 140 edits a message for transmission to the mobile station making the handover request, and then outputs the edited message to the message transmitting and receiving unit (for wireless communication) 111. When obtaining from the candidate-cell extracting unit 133 a handover response message notifying that a handover preparation fails, the message editing unit 140 edits a message for transmission to SeNB, and then outputs the edited message to the message transmitting and receiving unit (for wired communication) 110. When obtaining a handover request message from the self-station determining unit 134, for transmission to another wireless base station, the message editing unit 140 edits a handover request message including a plurality of cell candidates for output to the message transmitting and receiving unit (for wired communication) 110. When obtaining from the handover preparing unit 135 a handover response message notifying that a handover preparation is successful, the message editing unit 140 edits a message for transmission to SeNB and then outputs the edited message to the message transmitting and receiving unit (for wired communication) 110.

The management data 150 includes call information data 151 and cell information data 152. The call information data 151 retains information about a cell connected to the mobile station upon request for connection from the mobile station to cause a call, the cell taking an identification number assigned to each call as an index. The call information data 151 also retains information about a wireless base station (node) of a communication counterpart.

The cell information data 152 retains information about cells managed by the wireless base station itself and information about cells managed by adjacent wireless base stations.

The resource managing unit 160 includes wired resources 161 and wireless resources 162. When obtaining a resource allocation request or a resource deallocation request from the call controlling unit 120 to a cell, the resource managing unit 160 uses the wired resources 161 and the wireless resources 162 to allocate or deallocate a resource to or from the cell.

The wired resources 161 retain information about wired resources of the wireless base station itself that are connected to a gateway apparatus, which is an upper node of the wireless base station itself. The wireless resources 162 retains information about wireless resources of the cells managed by the wireless base station itself.

FIG. 5 is a functional block diagram of the configuration of the mobile station according to the first embodiment. As depicted in FIG. 5, a mobile station 400 includes a wireless transmitting and receiving unit 410, a handover detecting unit 420, a cell-candidate generating unit 430, a handover requesting unit 440, a cell obtaining unit 450, and a cell storage unit 460.

The handover detecting unit 420 detects the necessity of handover when the mobile station 400 moves among cells across wireless base stations. For example, the handover detecting unit 420 obtains from the wireless transmitting and receiving unit 410 receiving from a plurality of wireless base stations messages each notifying that the mobile station 400 is within a cell managed by the wireless base station itself, detecting that handover is necessary.

The cell-candidate generating unit 430 obtains from the handover detecting unit 420 cell information for each wireless base station, and generates a cell candidate list containing the obtained cells. At this time, the cell-candidate generating unit 430 may generate a cell candidate list by providing each obtained cell with a priority for handover preparation.

The handover requesting unit 440 outputs a handover request message to the wireless transmitting and receiving unit 410 so as to transmit to SeNB a handover request message including the cell candidate list generated by the cell-candidate generating unit 430.

The cell obtaining unit 450 obtains a handover response message including a cell newly serving as a wireless communication route for the mobile station 400 and information about a wireless base station that manages the cell from the wireless transmitting and receiving unit 410 that receives the handover response message from SeNB currently in communication, and then outputs to the cell storage unit 460 the cell serving as the wireless communication route and the information about the wireless base station that manages the cell. Here, the cell newly serving as the wireless communication route for the mobile station 400 is a cell in which a handover preparation is successful when one wireless base station in the cell candidate list sequentially performs a handover preparation for a plurality of cell candidates managed by the wireless base station itself.

The cell storage unit 460 has stored therein the cell output from the cell obtaining unit 450 and the wireless base station that manages the cell. With this, the wireless transmitting and receiving unit 410 performs wireless communication with the stored wireless base station via the cell.

Figure 6:
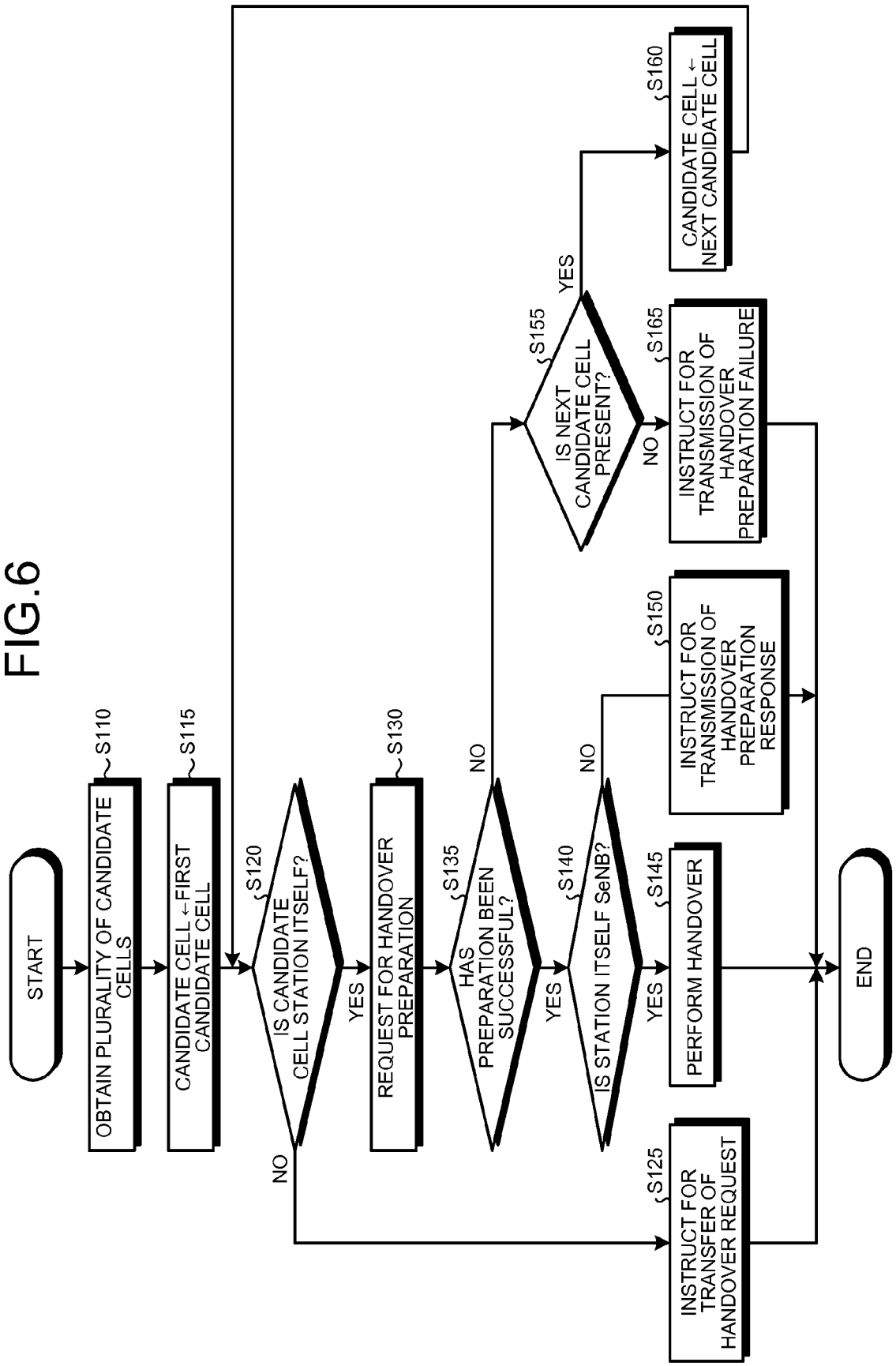
FIG. 6 is a flowchart of the process of a handover controlling unit according to the first embodiment.

Next, the process of the handover controlling unit 130 according to the first embodiment is explained with reference to FIG. 6. FIG. 6 is a flowchart of the process of the handover controlling unit according to the first embodiment.

First, a handover request message of the mobile station moving among cells across wireless base stations is obtained by the candidate-cell obtaining unit 131 (S110). At this time, the candidate-cell obtaining unit 131 simultaneously obtains a cell candidate list containing a plurality of cell candidates with which the mobile station can perform handover included in the handover request message. The candidate-cell obtaining unit 131 then causes the cell candidate list to be stored in the candidate-cell storage unit 132, and then outputs the handover request message to the candidate-cell extracting unit 133.

The candidate-cell extracting unit 133 obtaining the handover request message extracts from the cell candidate list retained in the candidate-cell storage unit 132 a highest-priority cell candidate and the name of a wireless base station that manages that cell (S115). As a result, the extracted cell candidate becomes a target cell for the following handover preparation. The candidate-cell extracting unit 133 then outputs the extracted priority, cell candidate, and name of the wireless base station that manages the cell candidate to the self-station determining unit 134.

The self-station determining unit 134 obtaining the priority, the cell candidate, and the name of the wireless base station that manages the cell candidate determines whether the obtained cell candidate is a cell managed by the wireless base station itself (S120). Specifically, the self-station determining unit 134 determines whether the obtained name of the wireless base station matches the wireless base station of the self-station determining unit 134.

When determining that the cell candidate is not a cell managed by the wireless base station itself ("No" at S120), the self-station determining unit 134 extracts from the candidate-cell storage unit 132 a cell candidate list with priorities lower than that of the cell candidate, and then instructs the message editing unit 140 to transfer a handover request message including the extracted cell candidate list to a wireless base station that manages the cell candidate (S125).

On the other hand, when determining that the cell candidate is a cell managed by the wireless base station itself ("Yes" at S120), the self-station determining unit 134 outputs to the handover preparing unit 135 the priority, the cell candidate, and the name of the wireless base station.

The handover preparing unit 135 obtaining the priority, the cell candidate, and the name of the wireless base station instructs the call controlling unit 120 to make a handover preparation request to the obtained cell candidate (S130).

Upon obtaining the handover preparation result from the call controlling unit 120, the handover preparing unit 135 determines whether the handover preparation result indicates success or failure (S135).

When determining that the handover preparation result indicates success ("Yes" at S135), the handover preparing unit 135 determines whether the wireless base station itself is SeNB (S140).

When determining that the wireless base station itself is SeNB ("Yes" at S140), the handover preparing unit 135 outputs to the handover performing unit 136 a handover performing request.

The handover performing unit 136 obtaining the handover performing request instructs the call controlling unit 120 to make a request for performing request (S145).

On the other hand, when determining that the wireless base station itself is not SeNB ("No" at S140), the handover preparing unit 135 instructs the message editing unit 140 to transmit a handover response message to SeNB so as to notify SeNB that the handover preparation is successful (S150).

When it is determined that the handover preparation result indicates failure ("No" at S135), a handover failure notification including the priority of the cell candidate for which the handover preparation fails is output to the candidate-cell extracting unit 133.

The candidate-cell extracting unit 133 receiving the handover failure notification including the priority of the cell candidate for which the handover preparation fails determines whether a cell candidate with a priority next highest to the priority of the current target cell is present so as to specify a next target cell for handover preparation (S155).

When a cell candidate with a priority next highest to the priority of the current target cell is present ("Yes" at S155), the candidate-cell extracting unit 133 extracts the cell candidate with a priority next highest to the priority of the current target cell and the name of a wireless base station that manages the cell candidate (S160). The candidate-cell extracting unit 133 then performs a handover preparation for the extracted cell candidate.

On the other hand, when a cell candidate with a priority next highest to the priority of the current target cell is not present ("No" at S155), the candidate-cell extracting unit 133 instructs the message editing unit 140 to transmit a handover failure message to SeNB (S165).

Figure 7:
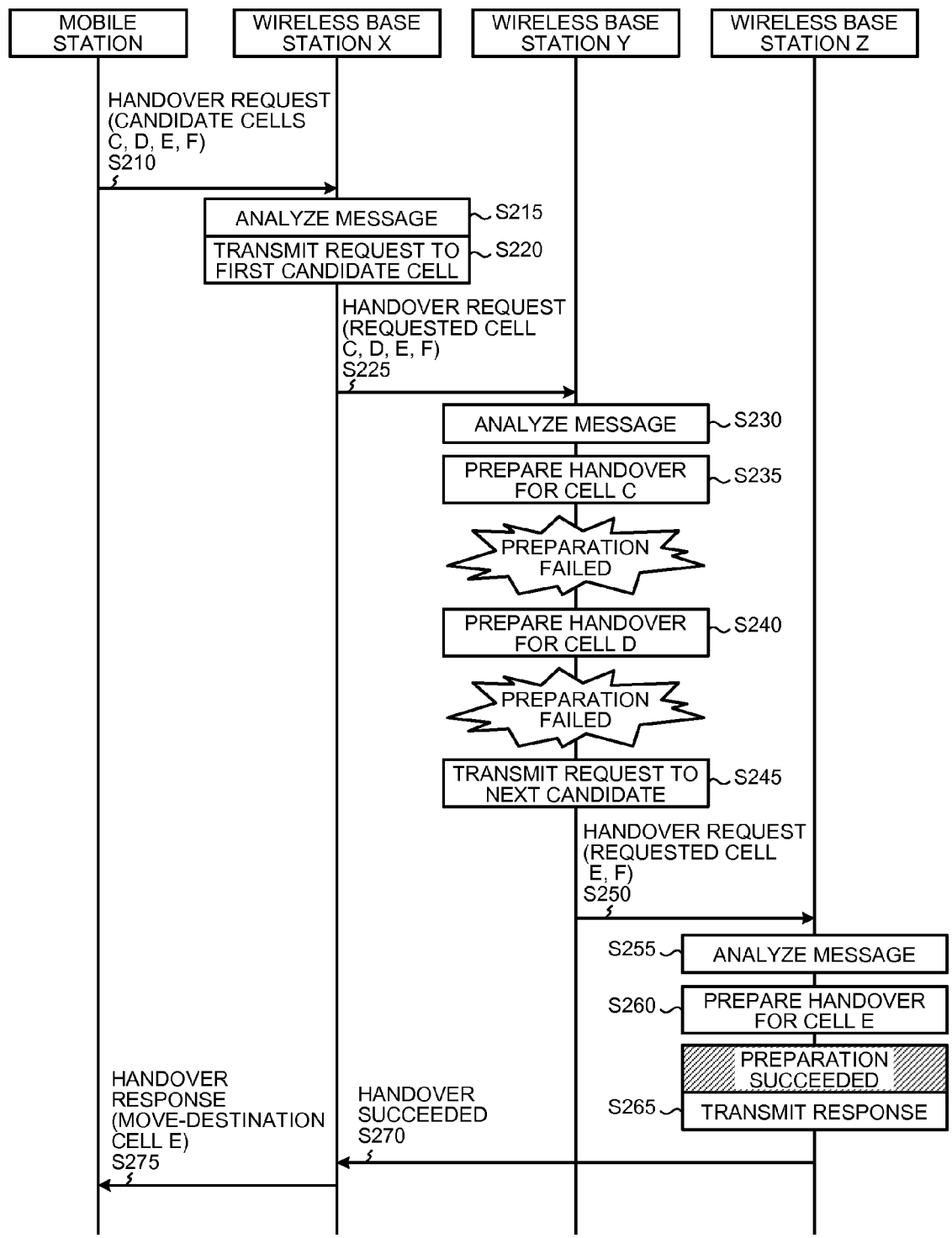
FIG. 7 is a sequence diagram of handover control across wireless base stations according to the first embodiment.

Next, handover control across wireless base stations according to the first embodiment is explained with reference to FIG. 7. FIG. 7 is a sequence diagram of handover control across wireless base stations according to the first embodiment. Here, it is assumed that the mobile station is currently in communication with a wireless base station X, and moves from an area managed by the wireless base station X to an area where a cell managed by a wireless base station Y and a cell managed by a wireless base station Z overlap each other. It is also assumed that the cell candidate list containing a plurality of cell candidates with which the mobile station can perform handover includes, for example, a cell C managed by the wireless base station Y as a first candidate cell, a cell D managed by the wireless base station Y as a second candidate cell, a cell E managed by the wireless base station Z as a third candidate cell, and a cell F managed by the wireless base station Z as a fourth candidate cell in order of decreasing priority so that a handover preparation is sequentially performed in order of the wireless base stations for the cell candidates managed by the respective wireless base stations.

First, the mobile station transmits to the wireless base station X currently in communication a handover request including a list containing a plurality of handover-enabled cell candidates (C, D, E, F) (S210).

The wireless base station X then obtains from the mobile station the handover request message including the list containing the cell candidates (C, D, E, F) via the candidate-cell obtaining unit 131 (S215).

The self-station determining unit 134 then determines whether the first candidate cell C is a cell managed by the wireless base station X itself and, when determining that the first candidate cell C is not a cell managed by the wireless base station X itself, transmits a handover request message including the list containing a first candidate cell onward (C, D, E, F) to the wireless base station Y managing the first candidate cell C via the message editing unit 140 (S220, S225).

Next, the wireless base station Y obtains from the wireless base station X the handover request message including the list containing cell candidates (C, D, E, F) via the candidate-cell obtaining unit 131 (S230).

The self-station determining unit 134 then determines whether the first candidate cell C is a cell managed by the wireless base station Y itself. When it is determined that the first candidate cell C is a cell managed by the wireless base station Y itself, the handover preparing unit 135 performs a handover preparation for the first candidate cell C (S235).

When the handover preparation by the handover preparing unit 135 fails, the self-station determining unit 134 then determines whether the second candidate cell D is a cell managed by the wireless base station Y itself. When it is determined that the second candidate cell D is a cell managed by the wireless base station Y itself, the handover preparing unit 135 performs a handover preparation for the second candidate cell D (S240).

When the handover preparation by the handover preparing unit 135 fails, the self-station determining unit 134 then determines whether the third candidate cell E is a cell managed by the wireless base station Y itself. When it is determined that the third candidate cell E is not a cell managed by the wireless base station Y itself, the handover preparing unit 135 transmits to the wireless base station Z manages the third candidate cell E a handover request message including a list containing the third candidate cell onward (E, F) via the message editing unit 140 (S245, S250).

The wireless base station Z then obtains from the wireless base station Y the handover request message including the list containing the cell candidates (E, F) via the candidate-cell obtaining unit 131 (S255).

The self-station determining unit 134 then determines whether the third candidate cell E is a cell managed by the wireless base station Z itself. When it is determined that the third candidate cell E is a cell managed by the wireless base station Z itself, the handover preparing unit 135 performs a handover preparation for the third candidate cell E (S260).

When the handover preparation by the handover preparing unit 135 is successful, the handover preparing unit 135 determines whether the wireless base station Z is SeNB and, when determining that the wireless base station Z is not SeNB, transmits via the message editing unit 140 to the wireless base station X, which is SeNB, a handover response message indicating that the handover preparation for the cell candidate E has been completed (S265, S270).

Upon obtaining the handover response message, the wireless base station X transmits to the mobile station a handover response to the handover request (S275). As a result, the mobile station ends handover.

As explained above, according to the first embodiment, the wireless base station 100 obtains a plurality of cell candidates usable for wireless communication of the mobile station with the wireless base stations, determines whether a cell candidate allowing wireless communication is included in a plurality of cell candidates managed by the wireless base station 100 itself from among the obtained cell candidates. As a result of determination, when wireless communication can be performed via at least any of the cell candidates managed by the wireless base station 100 itself, the wireless base station 100 notifies a base station apparatus with which the mobile station is in wireless communication that wireless communication can be performed with the mobile station.

In this manner, the wireless base station 100 can check the cell candidates managed by the wireless base station 100 itself from among the cell candidates usable for wireless communication until determining a cell candidate via which wireless communication can be performed. Therefore, the number of messages exchanged among the wireless base stations until handover is completed can be decreased. In particular, when many mobile stations simultaneously perform handover, the wireless base station 100 can reduce the load on the network with the wireless base stations currently in wireless communication with the mobile stations. As a result, the wireless base station 100 can reduce the time required for handover of the mobile station to complete.

Meanwhile, the example is explained in the first embodiment in which the wireless base station sequentially performs a handover preparation for the cell candidates managed by the wireless base station itself from among the cell candidates with which the mobile station can perform handover included in the cell candidate list and, when a handover preparation is successful, transmits a success notification to SeNB. The present invention is not meant to be restricted to this, however. Alternatively, a handover preparation may be sequentially performed for cell candidates managed by the wireless base station itself and, when a handover preparation is successful and a cell candidate managed by another wireless base station with a higher priority than the cell candidate where the handover preparation is successful is present, the cell candidate list may be transmitted to that other wireless base station.

Figure 8:
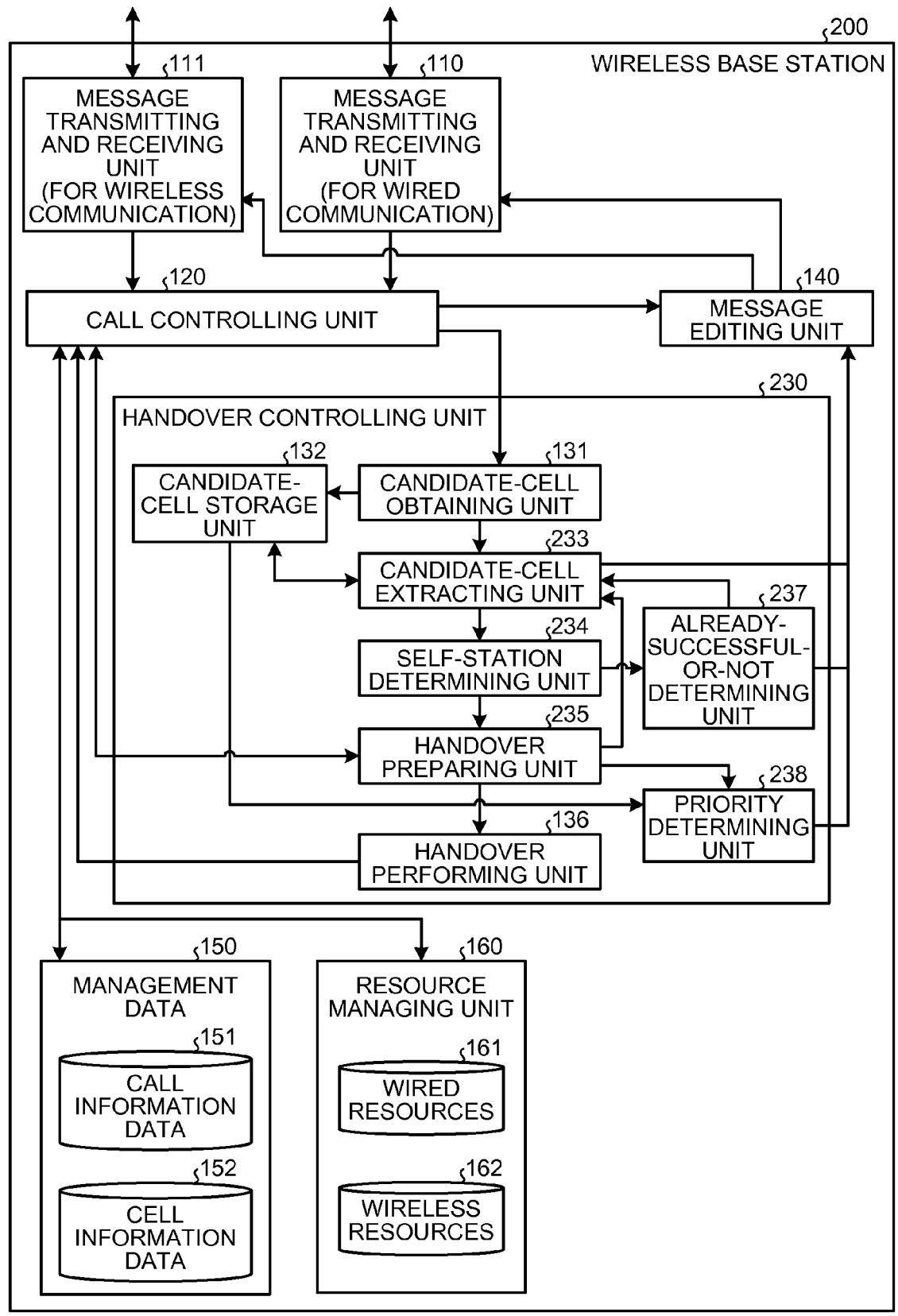
FIG. 8 is a functional block diagram of the configuration of a wireless base station according to a second embodiment.

In a second embodiment, a case is explained in which a handover preparation is sequentially performed for cell candidates managed by the wireless base station itself and, when a handover preparation is successful and a cell candidate managed by another wireless base station with a higher priority than the cell candidate where the handover preparation is successful is present, the cell candidate list is transmitted to that other wireless base station. First, the configuration of a wireless base station according to the second embodiment is explained with reference to FIG. 8. FIG. 8 is a functional block diagram of the configuration of the wireless base station according to the present embodiment. As depicted in FIG. 8, in a wireless base station 200 according to the second embodiment, an already-successful-or-not determining unit 237 and a priority determining unit 238 are added to the wireless base station according to the first embodiment (FIG. 3), and the candidate-cell extracting unit 133, the self-station determining unit 134, and the handover preparing unit 135 according to the first embodiment are changed to a candidate-cell extracting unit 233, a self-station determining unit 234, and a handover preparing unit 235. Note in FIG. 8 that components identical to those in FIG. 3 are provided with the same reference numerals and are not explained in detail.

The candidate-cell obtaining unit 131 obtains from the call controlling unit 120 a handover request message including a cell candidate list, and then causes the cell candidate list to be stored in the candidate-cell storage unit 132. The candidate-cell obtaining unit 131 then outputs the handover request message to the candidate-cell extracting unit 233. Here, the cell candidate list is a list containing a plurality of cell candidates with which the mobile station can perform handover, and also retains the result of handover preparation already performed at other wireless base stations.

When obtaining the handover request message from the candidate-cell obtaining unit 131, the candidate-cell extracting unit 233 extracts from the candidate-cell storage unit 132 a cell candidate corresponding to the highest priority, the name of a wireless base station that manages the cell candidate, and the handover preparation result so as to specify the cell candidate for handover preparation. Also, when obtaining from the handover preparing unit 235 a handover failure notification including the priority of the cell candidate in which a handover preparation has been performed, the candidate-cell extracting unit 233 extracts a cell candidate corresponding to a priority next highest to the priority of the cell candidate in which the handover preparation has been performed and the name of a wireless base station that manages the cell candidate. Furthermore, when notified by the already-successful-or-not determining unit 237 that a handover preparation for a cell candidate not managed by the wireless base station itself is not successful, the candidate-cell extracting unit 233 extracts a cell candidate corresponding to a priority next highest to the priority of the cell candidate not managed by the wireless base station itself and the name of a wireless base station that manages the cell candidate. At this time, when no cell candidate corresponding to the next-highest priority is present and a handover preparation for all cell candidates fails, the candidate-cell extracting unit 233 instructs the message editing unit 140 to transmit a handover failure message to SeNB. On the other hand, when no cell candidate corresponding to the next-highest priority is present and any of the plurality of cell candidates to which a handover preparation is not yet performed is present, the candidate-cell extracting unit 233 instructs the message editing unit 140 to transmit a handover request message including a plurality of cell candidates to a wireless base station that manages a cell candidate with the highest priority from among the cell candidates in which a handover preparation is not yet performed. Then, when a cell candidate corresponding to a priority next highest to the priority is present, the candidate-cell extracting unit 233 outputs to the self-station determining unit 234 the extracted priority, cell candidate, and name of the wireless base station, and the handover preparation result.

When obtaining from the candidate-cell extracting unit 233 the priority, cell candidate, name of the wireless base station, handover preparation result, the self-station determining unit 234 determines whether the obtained wireless base station is the wireless base station of the self-station determining unit 234 so that a handover preparation is performed for the cell candidate of the wireless base station itself. When the wireless base station corresponding to the obtained name of the wireless base station is the wireless base station of the self-station determining unit 234, the self-station determining unit 234 outputs the priority, the cell candidate, and the name of the wireless base station to the handover preparing unit 235. On the other hand, when the wireless base station corresponding to the obtained name of the wireless base station is not the wireless base station of the self-station determining unit 234, the self-station determining unit 234 outputs the priority, the cell candidate, and the handover preparation result to the already-successful-or-not determining unit 237.

When obtaining from the self-station determining unit 234 the priority, the cell candidate, and the name of the wireless base station, the handover preparing unit 235 instructs the call controlling unit 120 to make a handover preparation request to the cell candidate. When obtaining a handover preparation success notification from the call controlling unit 120, if the wireless base station managing the cell candidate is SeNB, the handover preparing unit 235 outputs a handover performing request to the handover performing unit 136 so that wireless communication is switched from the cell of move origin to the cell of move destination. If the wireless base station managing the cell candidate is not SeNB, the handover preparing unit 235 outputs the priority and the cell candidate to the priority determining unit 238. On the other hand, when obtaining a handover preparation failure notification from the call controlling unit 120, the handover preparing unit 235 outputs to the candidate-cell extracting unit 233 a handover failure notification including the priority of the cell candidate in which a handover preparation has been performed.

When obtaining from the self-station determining unit 234 the priority, the cell candidate, and the handover preparation result, the already-successful-or-not determining unit 237 determines whether a handover preparation for the cell candidate has already been successful. Specifically, the already-successful-or-not determining unit 237 determines whether the obtained handover preparation result indicates "success". When the handover preparation result indicates "success", the already-successful-or-not determining unit 237 instructs the message editing unit 140 to transmit a handover response message to SeNB so as to notify SeNB that the handover preparation for the cell candidate has been successful. On the other hand, when the obtained handover preparation result does not indicate "success", the already-successful-or-not determining unit 237 outputs the obtained priority to the candidate-cell extracting unit 233.

When obtaining the priority and the cell candidate from the handover preparing unit 235, the priority determining unit 238 determines whether the priority of the cell candidate is the highest in the cell candidate list. That is, the priority determining unit 238 determines whether a cell candidate that is managed by a wireless base station other than the wireless base station of the priority determining unit 238, is higher in priority than the obtained priority of the cell candidate, and for which a handover preparation is not yet performed is in the cell candidate list. When determining that the obtained priority of the cell candidate is the highest in the cell candidate list, the priority determining unit 238 instructs the message editing unit 140 to transmit a handover response message to SeNB so as to notify SeNB that a handover preparation is successful. On the other hand, when determining that the obtained priority of the cell candidate is not the highest in the cell candidate list, the priority determining unit 238 instructs the message editing unit 140 to transmit a handover request message including a plurality of cell candidates to a wireless base station that manages a cell candidate with the highest priority among cell candidates for which a handover preparation is not yet performed.

Figure 9:
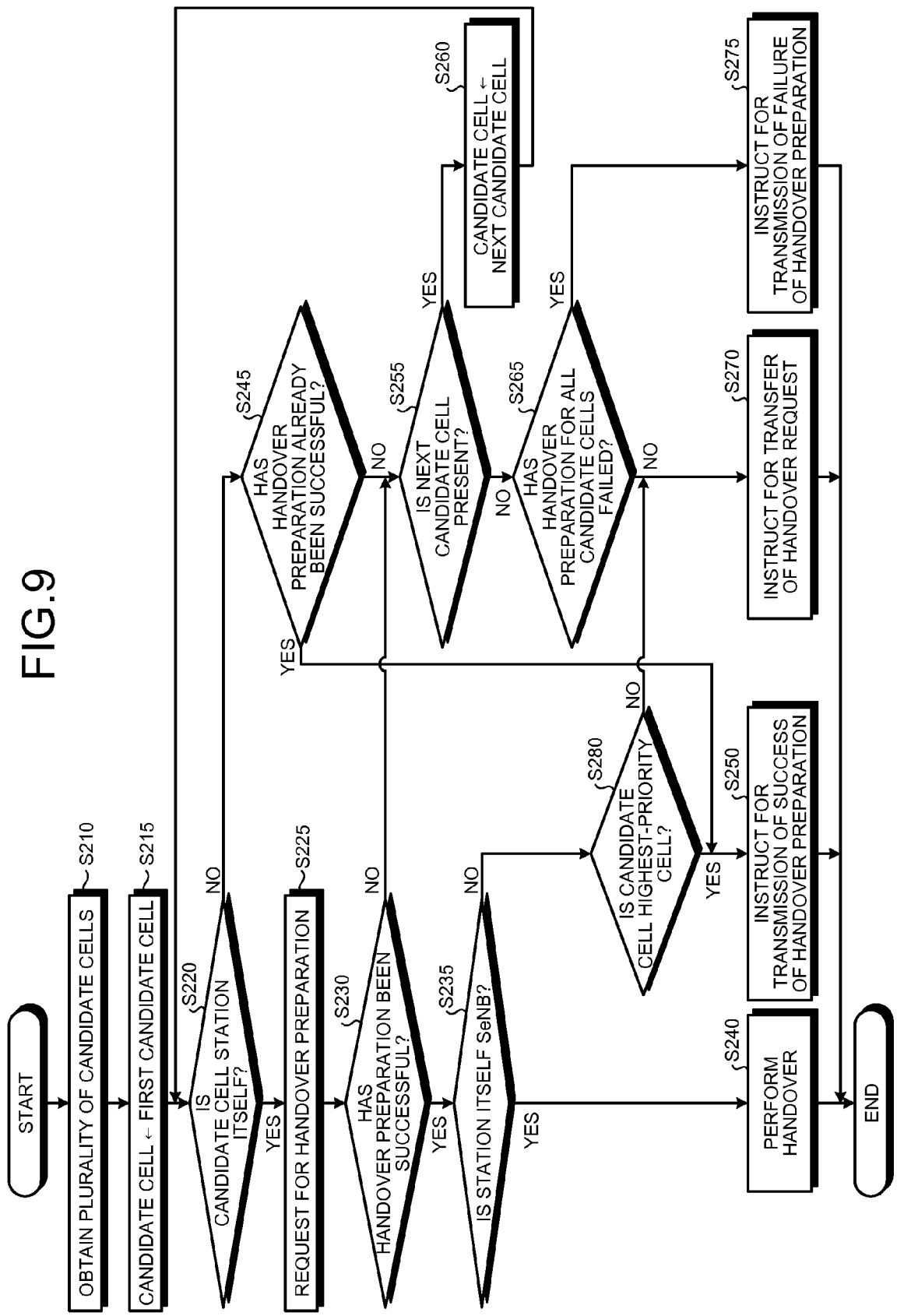
FIG. 9 is a flowchart of the process of a handover controlling unit according to the second embodiment.

Next, the process of a handover controlling unit 230 according to the second embodiment is explained with reference to FIG. 9. FIG. 9 is a flowchart of the process of the handover controlling unit according to the second embodiment.

First, a handover request message of the mobile station moving among cells across wireless base stations is obtained by the candidate-cell obtaining unit 131 (S210). At this time, the candidate-cell obtaining unit 131 simultaneously obtains a cell candidate list including a plurality of cell candidates with which handover can be performed by the mobile station included in the handover request message. The candidate-cell obtaining unit 131 then causes the cell candidate list to be stored in the candidate-cell storage unit 132, and then outputs the handover request message to the candidate-cell extracting unit 233.

The candidate-cell extracting unit 233 obtaining the handover request message extracts from the cell candidate list retained in the candidate-cell storage unit 132 a cell candidate with the highest priority, the name of a wireless base station that manages the cell, and the handover preparation result (S215). As a result, the extracted cell candidate is a target cell for the following handover preparation. The candidate-cell extracting unit 233 then outputs the extracted priority, cell candidate and name of the wireless base station that manages the cell candidate, and the handover preparation result to the self-station determining unit 234.

The self-station determining unit 234 obtaining the priority, the cell candidate, the name of the wireless base station that manages the cell, and the handover preparation result determines whether the cell candidate is a cell managed by the wireless base station of the self-station determining unit 234 (S220). Specifically, the self-station determining unit 134 determines whether the obtained name of the wireless base station matches the name of the wireless base station of the self-station determining unit 234.

When determining that the cell candidate is a cell managed by the wireless base station of the self-station determining unit 234 ("Yes" at S220), the self-station determining unit 234 outputs the priority, the cell candidate, and the name of the wireless base station to the handover preparing unit 235.

The handover preparing unit 235 obtaining the priority, the cell candidate, and the name of the wireless base station instructs the call controlling unit 120 to make a handover preparation request to the obtained cell candidate (S225).

When obtaining the handover preparation result from the call controlling unit 120, the handover preparing unit 235 determines whether the handover preparation result indicates success (S230).

When determining that the handover preparation result indicates success ("Yes" at S230), the handover preparing unit 235 determines whether the wireless base station itself is SeNB (S235).

When determining that the wireless base station itself is SeNB ("Yes" at S235), the handover preparing unit 235 outputs a handover performing request to the handover performing unit 136.

The handover performing unit 136 obtaining the handover performing request instructs the call controlling unit 120 to make a handover performing request (S240).

On the other hand, when determining that the wireless base station itself is not SeNB ("No" at S235), the handover preparing unit 235 outputs the priority and the cell candidate to the priority determining unit 238.

The priority determining unit 238 obtaining the priority and the cell candidate determines whether the priority of the cell candidate is highest in the cell candidate list (S280).

When it is determined that the priority of the cell candidate is highest in the cell candidate list ("Yes" at S280), the message editing unit 140 is instructed to transmit a handover response message to SeNB so that SeNB is notified that a handover preparation is successful (S250).

On the other hand, when it is determined that the priority of the cell candidate is not highest in the cell candidate list ("No" at S280), the message editing unit 140 is instructed to transmit a handover request message including a plurality of cell candidates to a wireless base station that manages the highest-priority cell candidate among cell candidates for which a handover preparation is not yet performed (S270).

When determining that the cell candidate is not the wireless base station itself ("No" at S220), the self-station determining unit 234 outputs the priority, the cell candidate, and the handover preparation result to the already-successful-or-not determining unit 237.

The already-successful-or-not determining unit 237 obtaining the priority, the cell candidate, and the handover preparation result determines whether a handover preparation for the cell candidate has already been successful (S245).

When determining that a handover preparation for the cell candidate has already been successful ("Yes" at S245), the already-successful-or-not determining unit 237 instructs the message editing unit 140 to transmit a handover response message to SeNB so as to notify SeNB that a handover preparation has bee successful (S250).

On the other hand, when it is determined by the already-successful-or-not determining unit 237 that a handover preparation for the cell candidate has not been successful ("No" at S245) or when it is determined by the handover preparing unit 235 that the handover preparation result does not indicate success ("No" at S230), the already-successful-or-not determining unit 237 or the handover preparing unit 235 outputs the priority to the candidate-cell extracting unit 233 for extracting a cell candidate for a next handover preparation.

The candidate-cell extracting unit 233 obtaining the priority determines whether a cell candidate corresponding to a priority next highest to the priority of the current cell candidate is present (S255).

When determining that a cell candidate corresponding to a priority next highest to the priority of the current cell candidate is present ("Yes" at S255), the candidate-cell extracting unit 233 extracts a cell candidate corresponding to the priority next highest to the priority of the current target cell, the name of a wireless base station that manage the cell candidate with the next-highest priority, and the handover preparation result (S260). The candidate-cell extracting unit 233 then performs a handover preparation for the extracted cell candidate.

On the other hand, when determining that a cell candidate corresponding to a priority next highest to the priority of the current cell candidate is not present ("No" at S255), the candidate-cell extracting unit 233 determines whether a handover preparation fails for all of the cell candidates (S265).

When determining that a handover preparation fails for not all of the cell candidates ("No" at S265), the candidate-cell extracting unit 233 instructs the message editing unit 140 to transmit a handover request message including a plurality of cell candidates to a wireless base station that manages a cell candidate with the highest priority among cell candidates for which a handover preparation is not yet performed (S270).

On the other hand, when determining that a handover preparation fails for all of the cell candidates ("Yes" at S265), the candidate-cell extracting unit 233 instructs the message editing unit 140 to transmit a handover failure message to SeNB (S275).

Figure 10:
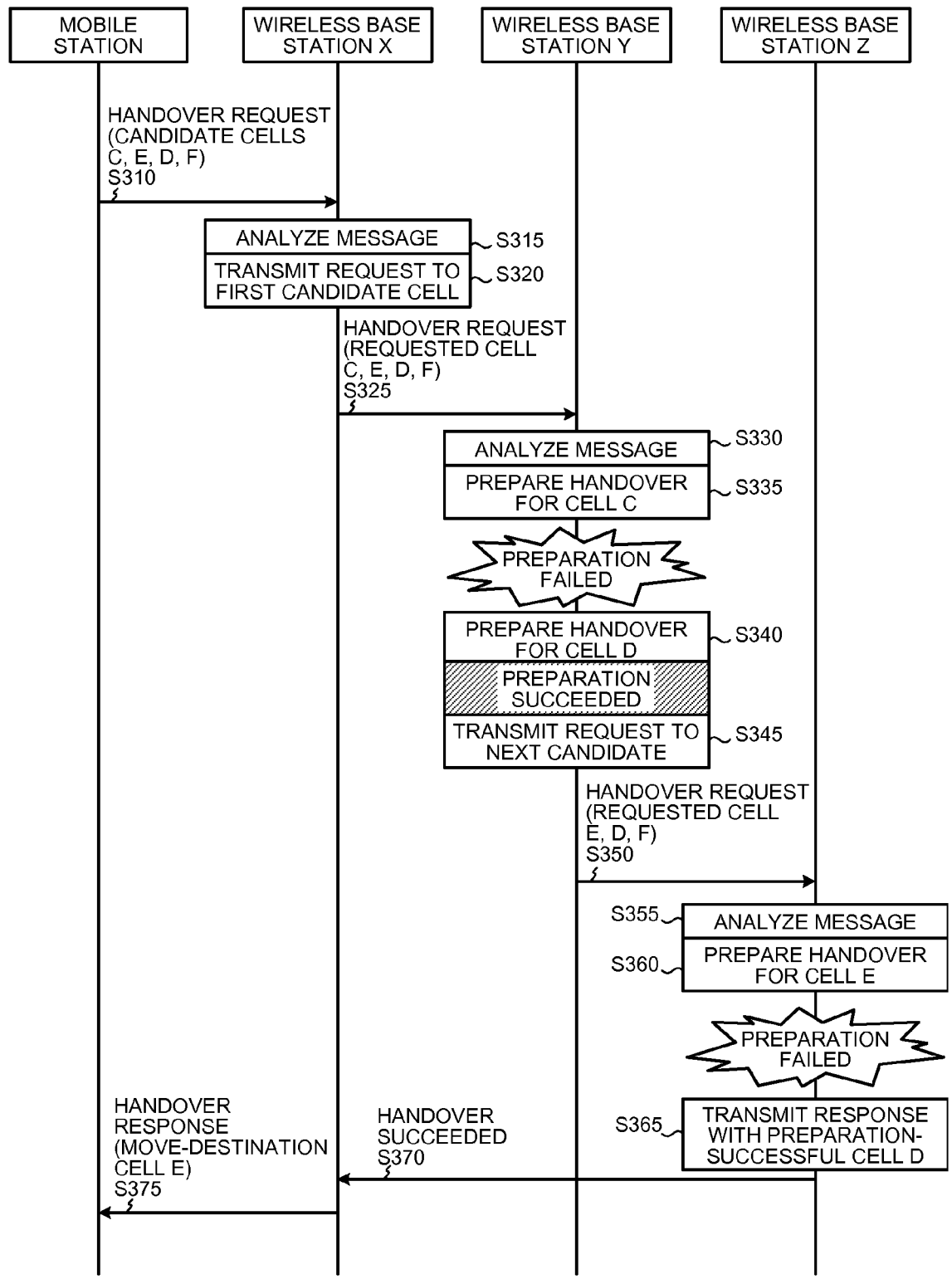
FIG. 10 is a sequence diagram of handover control across wireless base stations according to the second embodiment.

Next, handover control across wireless base stations according to the second embodiment is explained with reference to FIG. 10. FIG. 10 is a sequence diagram of handover control across wireless base stations according to the second embodiment. Here, it is assumed that the mobile station is currently in communication with a wireless base station X, and moves from an area managed by the wireless base station X to an area where a cell managed by a wireless base station Y and a cell managed by a wireless base station Z overlap each other. It is also assumed that the cell candidate list containing a plurality of cell candidates with which the mobile station can perform handover includes, for example, a cell C managed by the wireless base station Y as a first candidate cell, a cell E managed by the wireless base station Z as a second candidate cell, a cell D managed by the wireless base station Y as a third candidate cell, and a cell F managed by the wireless base station Z as a fourth candidate cell in order of decreasing priority.

First, the mobile station transmits to the wireless base station X currently in communication a handover request including a list containing a plurality of handover-enabled cell candidates (C, E, D, F) (S310).

The wireless base station X then obtains the handover request message including the list containing the cell candidates (C, E, D, F) via the candidate-cell obtaining unit 131 from the mobile station (S315).

Since all cell candidates in the list containing the cell candidates (C, E, D, F) are not managed by the wireless base station X and no handover preparation is performed for any of these cell candidates, the candidate-cell extracting unit 233 of the wireless base station X transmits via the message editing unit 140 a handover request message including a list containing the highest-priority first candidate cell onward (C, E, D, F) to the wireless base station Y managing the first candidate cell C (S320, S325).

Next, the wireless base station Y obtains from the wireless base station X the handover request message including the list containing cell candidates (C, E, D, F) via the candidate-cell obtaining unit (S330).

The self-station determining unit 234 of the wireless base station Y determines whether the first candidate cell C is a cell managed by the wireless base station Y. When it is determined that the first candidate cell C is a cell managed by the wireless base station Y, the handover preparing unit 235 performs a handover preparation for the first candidate cell C (S335).

When a handover preparation by the handover preparing unit 235 fails, the self-station determining unit 234 determines whether the second candidate cell E, which is the next highest priority cell, is a cell managed by the wireless base station Y. When determining that the second candidate cell E is not a cell managed by the wireless base station Y, the self-station determining unit 234 determines whether the third candidate cell D, which is a further next highest priority cell, is a cell managed by the wireless base station Y. When it is determined that the third candidate cell D is a cell managed by the wireless base station Y, the handover preparing unit 235 performs a handover preparation for the third candidate cell D (S340).

When a handover preparation by the handover preparing unit 235 is successful, the priority determining unit 238 determines whether the priority of the third candidate cell D for which the handover preparation is successful is the highest in the cell candidate list. Since a handover preparation is not yet performed for the second candidate cell with a priority higher than the priority of the third candidate cell D, the priority determining unit 238 determines that the third candidate cell D is not highest. Then, a handover request message including a list containing the second candidate cell onward (E, D, F) is transmitted via the message editing unit 140 to the wireless base station Z managing the second candidate cell E (S345, S350).

The wireless base station Z then obtains from the wireless base station Y the handover request message including the list containing the cell candidates (E, D, F) via the candidate-cell obtaining unit 131 (S355).

The self-station determining unit 234 then determines whether the second candidate cell E is a cell managed by the wireless base station Z. When it is determined that the second candidate cell E is a cell managed by the wireless base station Z, the handover preparing unit 235 performs a handover preparation for the second candidate cell E (S360).

When a handover preparation by the handover preparing unit 235 fails, the self-station determining unit 234 then determines whether the third candidate cell D, which is a further next priority cell, is a cell managed by the wireless base station Z. When the self-station determining unit 234 determines that the third candidate cell D is not a cell managed by the wireless base station Z, the already-successful-or-not determining unit 237 determines whether a handover preparation for the third candidate cell D has already been successful. When determining that a handover preparation for the third candidate cell D has already been successful, the already-successful-or-not determining unit 237 transmits to the wireless base station X, which is SeNB, via the message editing unit 140 a handover response message indicating that a handover preparation for the candidate cell D has been completed (S365, S370).

When obtaining the handover response message, the wireless base station X transmits a handover response to the handover request to the mobile station (S375). As a result, the mobile station ends handover.

As explained above, according to the second embodiment, the wireless base station 200 obtains, in addition to a plurality of cell candidates usable for wireless communication of the mobile station with wireless base stations, a priority of each cell candidate for performing wireless communication and a wireless base station managing each cell candidate, and determines whether a cell candidate allowing wireless communication is included in a plurality of cell candidates managed by the wireless base station itself from among the obtained cell candidates. As a result of determination, when wireless communication can be performed via the cell candidate managed by the wireless base station itself, the wireless base station 200 transfers the plurality of cell candidates to a wireless base station that manages a cell candidate higher in priority than the cell candidate. When no wireless base station to which the cell candidates are to be transferred is present, the wireless base station 200 notifies a wireless base station with which the mobile station is currently in wireless communication that wireless communication can be performed with the mobile station.

In this manner, even when wireless communication can be performed via at least one of the cell candidates managed by the wireless base station 200 itself from among the cell candidates, if a cell candidate of another wireless base station higher in priority than the cell candidate allowing wireless communication is present, the wireless base station 200 transfers cell candidates to the other wireless base station. With this, even if wireless communication via the cell candidate performed at the other wireless base station cannot be performed, wireless communication via the cell candidate of transfer origin can be allowed already, and therefore the candidate cells do not have to be transferred again to the transfer origin. With this, the number of messages exchanged among wireless base stations can be decreased.

Meanwhile, the example is explained in the first and second embodiments in which the wireless base station sequentially performs a handover preparation based on the cell candidate list obtained from SeNB. The present invention is not meant be restricted to this, however. Alternatively, a handover preparation may be sequentially performed based on a cell candidate list with the priority of a cell candidate that has previously failed a handover preparation being lowered.

Figure 11:
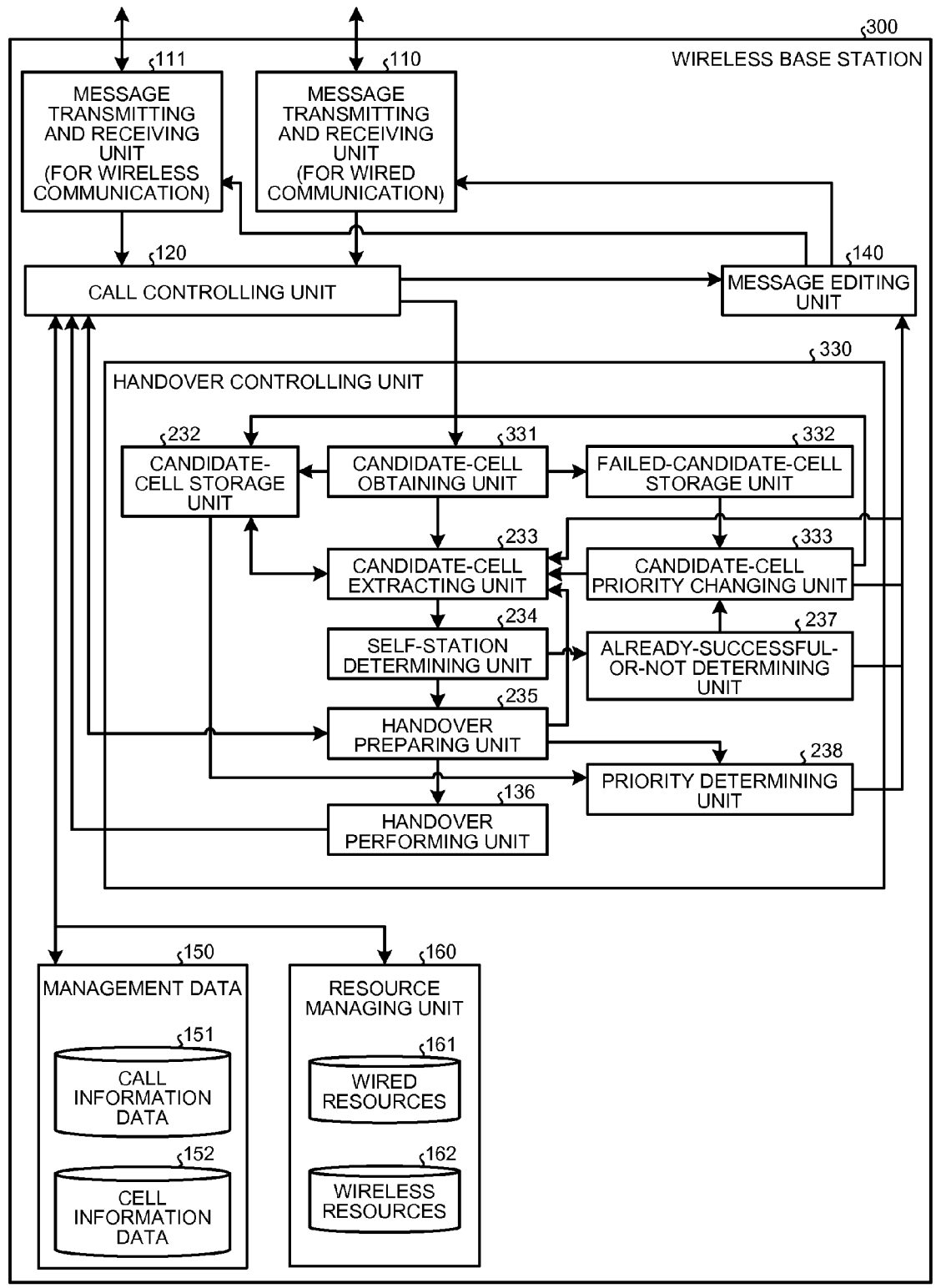
FIG. 11 is a functional block diagram of the configuration of a wireless base station according to a third embodiment.

In a third embodiment, a case is explained in which a handover preparation is sequentially performed based on a cell candidate list with the priority of a cell candidate that has previously failed a handover preparation being lowered. First, the configuration of a wireless base station according to the third embodiment is explained with reference to FIG. 11. FIG. 11 is a functional block diagram of the configuration of the wireless base station according to the third embodiment. As depicted in FIG. 11, in a wireless base station 300 according to the third embodiment, a failed-candidate-cell storage unit 332 and a candidate-cell priority changing unit 333 are added to the wireless base station according to the second embodiment (FIG. 8), and the candidate-cell obtaining unit 131 according to the first and second embodiments is changed to a candidate-cell obtaining unit 331. Note in FIG. 11 that components identical to those in FIG. 8 are provided with the same reference numerals and are not explained in detail.

The candidate-cell obtaining unit 331 obtains from the call controlling unit 120 a handover request message including a cell candidate list. Here, the cell candidate list is a list containing a plurality of cell candidates with which the mobile station can perform handover, and also containing the success and failure results of handover preparations already performed in other wireless base stations. For utilization at the time of next handover request onward, the candidate-cell obtaining unit 331 causes cell candidates of other wireless base station that have failed a handover preparation from among the obtained cell candidate list to be stored in the failed-candidate-cell storage unit 332. The candidate-cell obtaining unit 331 then generates a cell candidate list by deleting the cell candidate of the other wireless base stations that have failed a handover preparation from the obtained cell candidate list, and then causes the list to be stored in a candidate-cell storage unit 232. The candidate-cell obtaining unit 331 then outputs a handover request message to the candidate-cell extracting unit 233.

The failed-candidate-cell storage unit 332 retains the cell candidates of the other wireless base station that have failed a handover preparation at the time of handover requests previous to this time. The failed-candidate-cell storage unit 332 may store the retained cell candidates until the time of a handover request next time onward, or may store for a predetermine period of time by using a timer or the like.

When obtaining a priority, a cell candidate, and the handover preparation result from the self-station determining unit 234, the already-successful-or-not determining unit 237 determines whether a handover preparation for the cell candidate has already been successful. Specifically, when the obtained handover preparation result indicates "success", the already-successful-or-not determining unit 237 instructs the message editing unit 140 to transmit to SeNB a handover response message so as to notify SeNB that a handover preparation for the cell candidate has been successful. On the other hand, when the obtained handover preparation result does not indicate "success", the already-successful-or-not determining unit 237 outputs the obtained priority and cell candidate to the candidate-cell priority changing unit 333.

When the candidate-cell priority changing unit 333 obtains from the already-successful-or-not determining unit 237 the cell candidate not managed by the wireless base station itself and the priority thereof, if the cell candidate is retained in the failed-candidate-cell storage unit 332, the candidate-cell priority changing unit 333 causes a candidate list with the priority of the cell candidate being lowered to the lowest to be stored in the candidate-cell storage unit 232. With this, the candidate-cell priority changing unit 333 lowers the priority of the cell candidate that has previously failed a handover preparation to avoid a failure of a handover preparation this time, thereby reducing the time required for the mobile station to complete handover. Also, the candidate-cell priority changing unit 333 outputs the obtained priority to the candidate-cell extracting unit 233.

Figure 12A:
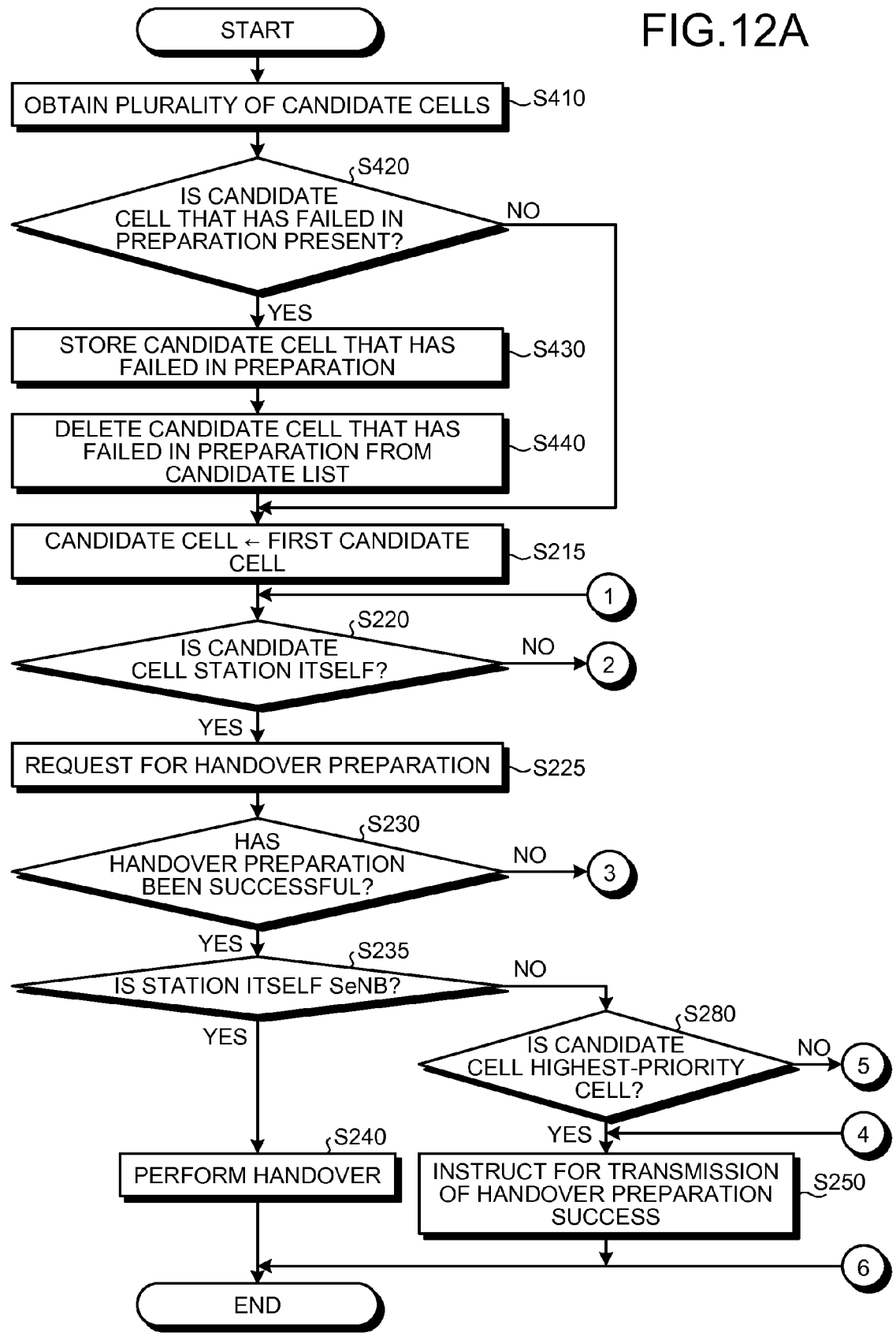

Next, the process of a handover controlling unit 330 according to the third embodiment is explained with reference to FIGS. 12A and 12B. FIGS. 12A and 12B are flowcharts of the process of the handover controlling unit according to the third embodiment. Note in FIGS. 12A and 12B that portions identical to those in FIG. 9 are provided with the same reference numerals and are not explained in detail.

First, a handover request message of the mobile station moving among cells across wireless base stations is obtained by the candidate-cell obtaining unit 331 (S410). At this time, the candidate-cell obtaining unit 331 simultaneously obtains a cell candidate list containing a plurality of cell candidates with which the mobile station can perform handover and also containing the success and failure results of handover preparations already performed at other wireless base stations.

The candidate-cell obtaining unit 331 then determines whether a cell candidate that has failed a handover preparation managed by other wireless base station is present in the obtained cell candidate list (S420).

When it is determined that a cell candidate that has failed a handover preparation managed by other wireless base station is not present in the obtained cell candidate list ("No" at S420), the candidate-cell obtaining unit 331 causes the obtained cell candidate list to be stored in the candidate-cell storage unit 232, and then outputs a handover preparation message to the candidate-cell extracting unit 233.

When it is determined that a cell candidate that has failed a handover preparation managed by other wireless base station is present in the obtained cell candidate list ("Yes" at S420), the candidate-cell obtaining unit 331 causes the cell candidate that has failed a handover preparation to be stored in the failed-candidate-cell storage unit 332 (S430).

Also, the candidate-cell obtaining unit 331 deletes the cell candidate that has failed a handover preparation from the cell candidate list (S440). The candidate-cell obtaining unit 331 then causes the cell candidate list without the deleted cell candidate to be stored as a cell candidate list in the candidate-cell storage unit 232, and then outputs a handover request message to the candidate-cell extracting unit 233.

The candidate-cell extracting unit 233 obtaining the handover request message extracts from the cell candidate list retained in the candidate-cell storage unit 232 a cell candidate with the highest priority, the name of a wireless base station that manages the cell candidate, and the handover preparation result (S215).

The self-station determining unit 234 obtaining the extracted priority, cell candidate, and name of the wireless base station that manages the cell candidate determines whether the cell candidate is a cell managed by the wireless base station itself (S220).

When determining that the cell candidate is not a cell managed by the wireless base station itself ("No" at S220), the self-station determining unit 234 outputs to the already-successful-or-not determining unit 237 the priority, the cell candidate, and the handover preparation result.

The already-successful-or-not determining unit 237 obtaining the priority, the cell candidate, and the handover preparation result determines whether a handover preparation for the cell candidate has already been successful (S245).

When determining that a handover preparation for the cell candidate has already been successful ("Yes" at S245), the already-successful-or-not determining unit 237 instructs the message editing unit 140 to transmit a handover response message to SeNB so as to notify SeNB that a handover preparation has been successful (S250).

On the other hand, when it is determined by the already-successful-or-not determining unit 237 that a handover preparation for the cell candidate has not been successful ("No" at S245), the already-successful-or-not determining unit 237 outputs the cell candidate and the priority to the candidate-cell priority changing unit 333.

The candidate-cell priority changing unit 333 obtaining the cell candidate and the priority determines whether the cell candidate has previously failed a handover preparation (S450). Specifically, the candidate-cell priority changing unit 333 determines whether the cell candidate is retained in the failed-candidate-cell storage unit 332.

When not determining that the cell candidate has previously failed a handover preparation ("No" at S450), the candidate-cell priority changing unit 333 outputs the obtained priority to the candidate-cell extracting unit 233.

When determining that the cell candidate has previously failed a handover preparation ("Yes" at S450), the candidate-cell priority changing unit 333 moves the priority of the candidate cell in the cell candidate list stored in the candidate-cell storage unit 232 to the lowest (S460). The candidate-cell priority changing unit 333 then outputs the obtained priority to the candidate-cell extracting unit 233.

The candidate-cell extracting unit 233 obtaining the priority then extracts the next cell candidate (S255, S260, S265).

When it is determined that the cell candidate is a cell managed by the wireless base station itself ("Yes" at S220), the handover preparing unit 235 performs a handover preparation for that cell (S225). When the handover preparation fails ("No" at S230), the candidate-cell extracting unit 233 then extracts a next cell candidate (S255, S260, S265).

On the other hand, when the handover preparation is successful ("Yes" at S230), the handover preparing unit 235 determines whether the wireless base station itself is SeNB (S235).

When it is determined that the wireless base station itself is SeNB ("Yes" at S235), the handover performing unit 136 performs handover (S240).

On the other hand, when it is determined that the wireless base station is not SeNB ("No" at S235), the priority determining unit 238 determines whether the priority of the cell candidate is the highest in the cell candidate list (S280).

When it is determined that the priority of the cell candidate is the highest in the cell candidate list ("Yes" at S280), the message editing unit 140 is instructed to transmit a handover response message to SeNB so that SeNB is notified that the handover preparation is successful (S250).

On the other hand, when it is not determined that the priority of the cell candidate is the highest in the cell candidate list ("No" at S280), the message editing unit 140 is instructed to transmit a handover request message including a plurality of cell candidates to a wireless base station that manages a cell candidate with the highest priority among cell candidates for which a handover preparation has not yet been performed (S270).

Figure 13:
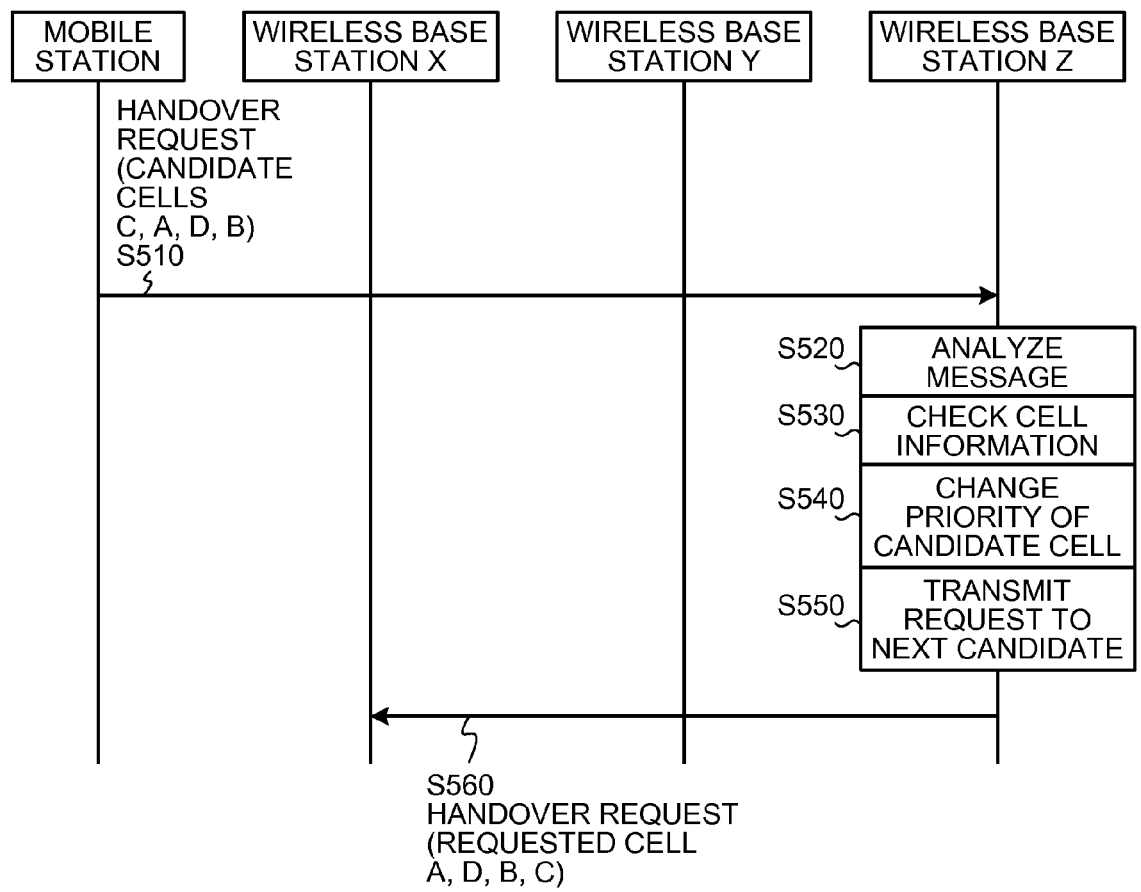
FIG. 13 is a sequence diagram of handover control across wireless base stations according to the third embodiment.

Next, handover control across wireless base stations according to the third embodiment is explained with reference to FIG. 13. FIG. 13 is a sequence diagram of handover control across wireless base stations according to the third embodiment. Here, it is assumed that the mobile station is currently in communication with a wireless base station Z, and moves from an area managed by the wireless base station Z to an area where a cell managed by a wireless base station X and a cell managed by a wireless base station Y overlap each other. It is also assumed that the cell candidate list containing a plurality of cell candidates with which the mobile station can perform handover includes, for example, a cell C managed by the wireless base station Y as a first candidate cell, a cell A managed by the wireless base station X as a second candidate cell, a cell D managed by the wireless base station Y as a third candidate cell, and a cell B managed by the wireless base station X as a fourth candidate cell in order of decreasing priority. Furthermore, it is assumed that information indicating that a handover preparation for the cell C has previously failed is retained in the failed-candidate-cell storage unit 332 of the wireless base station.

First, the mobile station transmits to the wireless base station Z currently in communication a handover request including a list containing a plurality of cell candidates (C, A, D, B) with which the mobile station can perform handover (S510).

The wireless base station Z then obtains from the mobile station the handover request message including the list containing the cell candidates (C, A, D, B) via the candidate-cell obtaining unit 331 (S520).

When any cell candidate in the list containing the cell candidates (C, A, D, B) not managed by the wireless base station Z is retained in the failed-candidate-cell storage unit 332, the candidate-cell priority changing unit 333 of the wireless base station Z changes the priority of the candidate cell to the lowest (S530).

Since the cell candidate C is retained in the failed-candidate-cell storage unit 332, the candidate-cell priority changing unit 333 lowers the priority of the cell candidate C to the lowest (S540). As a result, the cell candidate list becomes (A, D, B, C).

The candidate-cell extracting unit 233 transmits via the message editing unit 140 a handover request message including the list containing the cell candidates (A, D, B, C) to the wireless base station X managing the candidate cell A highest in priority in the candidate cells for which a handover preparation has not yet been performed (S550, S560).

The wireless base station X then obtains the list containing the cell candidates (A, D, B, C), sequentially trying to perform a handover preparation from the cell candidate A. Thereafter, the sequence of handover control of the wireless base station X is similar to that according to the second embodiment (FIG. 10), and is therefore not explained herein.

As explained above, according to the third embodiment, the wireless base station 300 obtains, in addition to a plurality of cell candidates usable for wireless communication of the mobile station with wireless base stations, a priority of each cell candidate for performing wireless communication and a wireless base station managing each cell candidate, and also obtains a cell candidate for which wireless communication was not able to be performed previously. The wireless base station 300 changes the priority of the cell candidate for which wireless communication was not able to be performed previously from among the obtained cell candidates to a lower priority. The wireless base station 300 then determines whether a cell candidate allowing wireless communication is included in a plurality of cell candidates with their priority being changed. As a result, when wireless communication can be performed via a cell candidate managed by the wireless base station 300 itself, the wireless base station 300 notifies a wireless base station with which the mobile station is currently in wireless communication that wireless communication can be performed with the mobile station.

In this manner, upon a handover request, the wireless base station 300 lowers the priority of the cell candidate for which wireless communication was not able to be performed previously from among the cell candidates. With this, the position in priority of performing handover for the cell candidate for which handover may also be unable to be performed this time can be lowered. Therefore, the time required for the mobile station to complete handover can be reduced.

Here, all or arbitrary part of process functions performed in each of the wireless base stations 100, 200, and 300 may be achieved by a program analyzed and executed by a Central Processing Unit (CPU), or maybe achieved as hardware with a wired logic.

In the base station apparatus, mobile station, wireless communication controlling method, and wireless communication control program disclosed in the specification, it can be determined whether a wireless communication route candidate via which wireless communication can be performed is included in a plurality of wireless communication route candidates. In turn, the number of messages among the wireless base stations in handover across the wireless base stations can be decreased, and therefore the load on the network can be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A base station apparatus comprising:
an obtaining unit that obtains a plurality of wireless communication route candidates and a priority of each of the plurality of wireless communication route candidates transmitted from another first base station apparatus;
a determining unit that, among the plurality of wireless communication route candidates, determines whether a first wireless communication route allowing the base station apparatus to perform wireless communication with a mobile station exists or not and determines whether a second wireless communication route managed by another second base station apparatus exists or not; and
a transmitting unit that, in accordance with the result of determination by the determining unit,
transmits a wireless communication route candidate including the second wireless communication route to the another second base station apparatus, when the first wireless communication route does not exist and the second wireless communication route exists, transmits a failure notification to the another first base station apparatus, when the first wireless communication route does not exist and the second wireless communication route does not exist, and transmits a wireless communication route candidate including the first wireless communication route and the second wireless communication route to the another second base station apparatus when the first wireless communication route exists and the first wireless communication route has a lower priority than the highest priority.

2. The base station apparatus according to claim 1, further comprising a extracting unit that, when the first wireless communication route does not exist and the second wireless communication route exists, extracts the second wireless communication route, wherein the wireless communication route candidate transmitted to the another second base station apparatus includes the extracted second wireless communication route and does not include the first wireless communication route.

3. The base station apparatus according to claim 1, wherein the determining unit includes:

a selecting unit that selects one wireless communication route from the plurality of wireless communication route candidates; and a self-station determining unit that determines whether the selected wireless communication route is a third wireless communication route managed by the base station apparatus, wherein when the selected wireless communication route is the third wireless communication route, the determining unit determines whether wireless communication can be performed via the selected wireless communication route.

4. The base station apparatus according to claim 3, wherein when the selected wireless communication route is not the third wireless communication route, the selecting unit selects another wireless communication route among the plurality of wireless communication route candidates.

5. The base station apparatus according to claim 1, wherein the transmitting unit transmits the wireless communication route candidate including the first wireless communication route and the second wireless communication route to the another second base station apparatus to allow the another second base station apparatus to transmit a success notification to the another first base station apparatus.

6. The base station apparatus according to claim 1, further comprising:

a disabled-route obtaining unit that obtains a wireless communication route via which wireless communication was not previously able to be performed, and a priority changing unit that lowers a priority of the wireless communication route obtained by the disabled-route obtaining unit among the priorities of the plurality of wireless communication route candidates, wherein the determining unit performs the determination among the plurality of wireless communication route candidates having the changed priorities.

7. A wireless communication controlling method in a base station apparatus, comprising:

obtaining a plurality of wireless communication route candidates and a priority of each of the plurality of wireless communication route candidates transmitted from another first base station apparatus;

among the plurality of wireless communication route candidates, determining whether a first wireless communication route allowing the base station apparatus to perform wireless communication with a mobile station exists or not and whether a second wireless communication route managed by another second base station apparatus exists or not; and transmitting, in accordance with the result of the determining, a wireless communication route candidate including the second wireless communication route to the another second base station apparatus, when the first wireless communication route does not exist and the second wireless communication route exists, a failure notification to the another first base station apparatus, when the first wireless communication route does not exist and the second wireless communication route does not exist, a wireless communication route candidate including the first wireless communication route and the second wireless communication route to the another second base station apparatus when the first wireless communication route exists and the first wireless communication route has a lower priority than the highest priority.

* * * * *